US011992084B2

(12) United States Patent
Salari-Sharif et al.

(10) Patent No.: US 11,992,084 B2
(45) Date of Patent: May 28, 2024

(54) FOOTWEAR MIDSOLE WITH 3-D PRINTED MESH HAVING AN ANISOTROPIC STRUCTURE AND METHODS OF MAKING THE SAME

(71) Applicant: adidas AG, Herzogenaurach (DE)

(72) Inventors: Ladan Salari-Sharif, Portland, OR (US); Jacques M. Perrault, Portland, OR (US); Iain Martin Hannah, Nuremberg (DE)

(73) Assignee: adidas AG, Herzogenaurach (DE)

(*) Notice: Subject to any disclaimer, the term of this patent is extended or adjusted under 35 U.S.C. 154(b) by 97 days.

(21) Appl. No.: 17/069,640

(22) Filed: Oct. 13, 2020

(65) Prior Publication Data

US 2022/0110406 A1    Apr. 14, 2022

(51) Int. Cl.
*A43B 13/18*    (2006.01)
*A43B 13/12*    (2006.01)
*B33Y 80/00*    (2015.01)

(52) U.S. Cl.
CPC .......... *A43B 13/186* (2013.01); *A43B 13/125* (2013.01); *A43B 13/181* (2013.01); *B33Y 80/00* (2014.12)

(58) Field of Classification Search
CPC ... A43B 13/186; A43B 13/181; A43B 13/125; A43B 13/12; A43B 13/14; A43B 13/141; A43D 2200/60
See application file for complete search history.

(56) References Cited

U.S. PATENT DOCUMENTS 354,693 A    12/1886   Dick
D29,749 S    11/1898   Bunker
1,111,437 A  9/1914    Butterfield
D90,057 S    5/1933    Cleef
D107,977 S   1/1938    Tousley
(Continued)

FOREIGN PATENT DOCUMENTS

CN    101611953 A    12/2009
CN    102578760 A     7/2012
(Continued)

OTHER PUBLICATIONS

Adidas Breaks the Mould With 3D-Printed Performance Footwear, [Retrieved on Oct. 7, 2015], Retrieved from the Internet: (http://www.adidas-group.com/en/media/news-archive/press-releases/2015/adi-das-breaks-mould-3d-printed-performance-footwear/).
(Continued)

*Primary Examiner* — Sharon M Prange
*Assistant Examiner* — Haley A Smith
(74) *Attorney, Agent, or Firm* — Sterne, Kessler, Goldstein & Fox P.L.L.C.

(57) ABSTRACT

Soles for an article of footwear with a three-dimensional mesh having a plurality of interconnected unit cells composed of one or more soft sub-cells and one or more stiff sub-cells. The arrangement of one or more soft sub-cells and one or more stiff sub-cells for the interconnected unit cells can provide the three-dimensional mesh with anisotropic properties, for example, anisotropic lattice shear moduli. In particular embodiments, the arrangement of soft sub-cells and stiff sub-cells for the unit cells can create a three-dimensional mesh predisposed to deform forwards when a sole including the three-dimensional mesh contacts the ground.

19 Claims, 23 Drawing Sheets

(56) References Cited

U.S. PATENT DOCUMENTS

| | | |
|---|---|---|
| D113,620 S | 3/1939 | Cairns |
| D115,636 S | 7/1939 | Sperry |
| 2,205,356 A | 6/1940 | Rose et al. |
| D123,898 S | 12/1940 | Tousley |
| D138,517 S | 8/1944 | Meltzer |
| 2,853,809 A | 9/1958 | Carlo et al. |
| D196,491 S | 10/1963 | Papoutsy |
| 3,253,601 A | 5/1966 | Scholl |
| 3,416,174 A | 12/1968 | Novitske |
| 3,793,750 A | 2/1974 | Bowerman |
| D241,484 S | 9/1976 | Castano |
| D241,688 S | 10/1976 | Johnson |
| 4,012,855 A | 3/1977 | Gardner |
| D254,818 S | 4/1980 | Jones |
| D255,175 S | 6/1980 | Iwakata |
| D255,177 S | 6/1980 | Fuzita |
| D255,178 S | 6/1980 | Fuzita |
| D257,075 S | 9/1980 | Amicone et al. |
| 4,271,606 A | 6/1981 | Rudy |
| 4,297,796 A | 11/1981 | Stirtz et al. |
| 4,309,831 A | 1/1982 | Pritt |
| D265,605 S | 8/1982 | Batra |
| 4,378,643 A | 4/1983 | Johnson |
| D272,963 S | 3/1984 | Muller et al. |
| 4,439,936 A | 4/1984 | Clarke et al. |
| D273,631 S | 5/1984 | Ueda |
| D278,851 S | 5/1985 | Austin |
| D279,620 S | 7/1985 | Ueda |
| D281,459 S | 11/1985 | Parker |
| 4,607,440 A | 8/1986 | Roberts et al. |
| D288,621 S | 3/1987 | Surpuriya et al. |
| D297,383 S | 8/1988 | Mourad et al. |
| 4,774,774 A | 10/1988 | Allen, Jr. |
| D299,681 S | 2/1989 | Miller et al. |
| D301,184 S | 5/1989 | Hase |
| D301,800 S | 6/1989 | Mitsui |
| D302,352 S | 7/1989 | Austin |
| D303,316 S | 9/1989 | Crowley |
| D307,817 S | 5/1990 | Schneider |
| D312,920 S | 12/1990 | Aveni |
| D316,324 S | 4/1991 | Rogers |
| D321,973 S | 12/1991 | Hatfield |
| D326,181 S | 5/1992 | Katz et al. |
| D333,555 S | 3/1993 | Hatfield et al. |
| D335,385 S | 5/1993 | Kawabata |
| D335,572 S | 5/1993 | Peterson |
| D336,775 S | 6/1993 | Smith |
| D337,428 S | 7/1993 | Allen, III et al. |
| 5,236,637 A | 8/1993 | Hull |
| D339,464 S | 9/1993 | Teague |
| 5,337,492 A | 8/1994 | Anderie et al. |
| 5,367,791 A | 11/1994 | Gross et al. |
| D354,693 S | 1/1995 | Miller |
| 5,391,072 A | 2/1995 | Lawton et al. |
| 5,423,135 A | 6/1995 | Poole et al. |
| D370,993 S | 6/1996 | Mangee |
| 5,529,473 A | 6/1996 | Lawton et al. |
| D384,795 S | 10/1997 | Hudson |
| D384,796 S | 10/1997 | Smith, III |
| D387,698 S | 12/1997 | Hatfield et al. |
| D389,993 S | 2/1998 | Ryan |
| D390,348 S | 2/1998 | Meyer et al. |
| D390,690 S | 2/1998 | Murai et al. |
| D391,747 S | 3/1998 | Avar |
| D393,341 S | 4/1998 | Marshall et al. |
| D394,342 S | 5/1998 | Schneider |
| D394,741 S | 6/1998 | Gaudio |
| D395,340 S | 6/1998 | Tresser |
| D395,343 S | 6/1998 | Lozano |
| D395,740 S | 7/1998 | Cass |
| D395,743 S | 7/1998 | Ryan |
| D397,546 S | 9/1998 | Merceron |
| 5,799,417 A | 9/1998 | Burke et al. |
| D400,345 S | 11/1998 | Teaque |
| D401,745 S | 12/1998 | Greenberg |
| D401,747 S | 12/1998 | Cessor |
| D402,450 S | 12/1998 | Munns |
| 5,862,614 A | 1/1999 | Koh |
| D404,897 S | 2/1999 | Marshall |
| D407,892 S | 4/1999 | Gaudio |
| D408,972 S | 5/1999 | Greenberg |
| D411,910 S | 7/1999 | Cessor |
| D412,050 S | 7/1999 | Chassaing |
| D412,239 S | 7/1999 | Sorofman |
| 5,930,916 A | 8/1999 | Connor |
| 5,983,529 A | 11/1999 | Serna |
| 5,985,383 A | 11/1999 | Allen et al. |
| 6,014,821 A | 1/2000 | Yaw |
| D420,208 S | 2/2000 | Birkenstock |
| 6,021,588 A | 2/2000 | Alviso |
| 6,076,283 A | 6/2000 | Boie |
| D432,762 S | 10/2000 | Weege |
| D432,763 S | 10/2000 | Smith, III |
| D433,215 S | 11/2000 | Smith, III |
| D442,768 S | 5/2001 | Matis |
| 6,259,962 B1 | 7/2001 | Gothait |
| 6,367,172 B2 | 4/2002 | Hernandez |
| D458,441 S | 6/2002 | Gillespie |
| D459,865 S | 7/2002 | Urie et al. |
| D461,040 S | 8/2002 | Urie et al. |
| D480,540 S | 10/2003 | Hoyt et al. |
| 6,665,958 B2 | 12/2003 | Goodwin |
| D485,662 S | 1/2004 | Magro |
| D488,916 S | 4/2004 | McClaskie |
| 6,763,611 B1 | 7/2004 | Fusco |
| D497,707 S | 11/2004 | Lee |
| D500,399 S | 1/2005 | Fuerst |
| D515,791 S | 2/2006 | McClaskie |
| D529,697 S | 10/2006 | Earle |
| D536,163 S | 2/2007 | McClaskie |
| D538,519 S | 3/2007 | McClaskie |
| D552,337 S | 10/2007 | Parekh et al. |
| D556,988 S | 12/2007 | Horne et al. |
| D561,438 S | 2/2008 | Belley |
| D561,439 S | 2/2008 | Schoenborn et al. |
| D561,443 S | 2/2008 | Robinson, Jr. et al. |
| 7,383,647 B2 | 6/2008 | Chan et al. |
| D572,462 S | 7/2008 | Hatfield et al. |
| D577,883 S | 10/2008 | Link |
| 7,438,846 B2 | 10/2008 | John |
| D586,994 S | 2/2009 | Chang |
| D593,741 S | 6/2009 | Vico et al. |
| D608,991 S | 2/2010 | Lamont |
| 7,676,955 B2 | 3/2010 | Dojan et al. |
| 7,704,430 B2 | 4/2010 | Johnson et al. |
| D616,640 S | 6/2010 | Werman |
| D621,143 S | 8/2010 | Lamont |
| 7,892,474 B2 | 2/2011 | Shkolnik et al. |
| D638,616 S | 5/2011 | Gibson |
| 8,110,135 B2 | 2/2012 | El-Siblani |
| D659,358 S | 5/2012 | Van Zyll De Jong et al. |
| 8,191,284 B2 | 6/2012 | Cho |
| D666,391 S | 9/2012 | Van Zyll De Jong et al. |
| D672,949 S | 12/2012 | Bramani et al. |
| D686,402 S | 7/2013 | Portzline |
| 8,522,454 B2 | 9/2013 | Schindler et al. |
| D691,359 S | 10/2013 | Della Valle et al. |
| D695,502 S | 12/2013 | Miner |
| D696,004 S | 12/2013 | Della Valle et al. |
| D696,505 S | 12/2013 | Miner |
| D697,294 S | 1/2014 | Miner |
| D702,028 S | 4/2014 | Truelsen |
| D702,428 S | 4/2014 | Hlavacs |
| D703,425 S | 4/2014 | Lee |
| 8,739,639 B2 | 6/2014 | Owings et al. |
| D707,933 S | 7/2014 | McCourt |
| D709,274 S | 7/2014 | Roulo |
| 8,776,396 B2 | 7/2014 | Huynh |
| D711,637 S | 8/2014 | Miner |
| D713,628 S | 9/2014 | Greenspan |
| D741,586 S | 10/2015 | Truelsen |
| D743,154 S | 11/2015 | Nethongkome |
| D744,212 S | 12/2015 | Boudreau et al. |
| 9,205,601 B2 | 12/2015 | DeSimone et al. |

(56) References Cited

U.S. PATENT DOCUMENTS

| | | |
|---|---|---|
| 9,211,678 B2 | 12/2015 | DeSimone et al. |
| 9,216,546 B2 | 12/2015 | DeSimone et al. |
| D747,860 S | 1/2016 | De Costa Pereira Machado |
| D751,797 S | 3/2016 | Slimane |
| 9,320,316 B2 | 4/2016 | Guyan et al. |
| 9,453,142 B2 | 9/2016 | Rolland et al. |
| D769,593 S | 10/2016 | Chang |
| D773,162 S | 12/2016 | Lane, III et al. |
| D779,174 S | 2/2017 | De Montgolfier |
| D783,973 S | 4/2017 | Anceresi |
| D784,666 S | 4/2017 | Lok |
| D789,060 S | 6/2017 | Guyan et al. |
| D790,821 S | 7/2017 | Beers et al. |
| D792,689 S | 7/2017 | Mokos |
| D796,170 S | 9/2017 | Raysse |
| D796,806 S | 9/2017 | Durand |
| D798,561 S | 10/2017 | Ford |
| D799,184 S | 10/2017 | Chang |
| D800,432 S | 10/2017 | Klein |
| D802,896 S | 11/2017 | Rademacher et al. |
| D804,792 S | 12/2017 | De Montgolfier et al. |
| D809,752 S | 2/2018 | Campbell |
| D812,882 S | 3/2018 | Jenkins et al. |
| 9,930,929 B2 | 4/2018 | Cooper et al. |
| D816,961 S | 5/2018 | Bardea |
| D819,310 S | 6/2018 | Lashmore |
| D822,351 S | 7/2018 | DeAlmeida |
| 10,010,133 B2 | 7/2018 | Guyan |
| 10,010,134 B2 | 7/2018 | Guyan |
| 10,016,013 B2 | 7/2018 | Kormann et al. |
| 10,034,516 B2 | 7/2018 | Gheorghian et al. |
| D825,163 S | 8/2018 | Montross et al. |
| D825,165 S | 8/2018 | Gibson et al. |
| 10,039,343 B2 | 8/2018 | Guyan |
| D829,425 S | 10/2018 | Albrecht et al. |
| D831,315 S | 10/2018 | Mahoney |
| D831,317 S | 10/2018 | Jenkins et al. |
| 10,104,934 B2 | 10/2018 | Guyan |
| D836,892 S | 1/2019 | Jenkins et al. |
| D841,299 S | 2/2019 | Nikolic |
| D841,300 S | 2/2019 | Albrecht et al. |
| D841,301 S | 2/2019 | Albrecht et al. |
| D841,964 S | 3/2019 | Kaiserswerth |
| 10,231,511 B2 | 3/2019 | Guyan et al. |
| D844,953 S | 4/2019 | Chen et al. |
| D845,610 S | 4/2019 | Mayden et al. |
| 10,259,171 B2 | 4/2019 | Robeson et al. |
| D847,481 S | 5/2019 | Albrecht et al. |
| D848,716 S | 5/2019 | Shyllon |
| D849,382 S | 5/2019 | Jenkins et al. |
| D850,083 S | 6/2019 | Jenkins et al. |
| D851,873 S | 6/2019 | Maier |
| D854,300 S | 7/2019 | Evans |
| D855,957 S | 8/2019 | Evans |
| D857,350 S | 8/2019 | Hardy |
| D857,360 S | 8/2019 | Hardy |
| D857,362 S | 8/2019 | Thompson |
| D858,066 S | 9/2019 | Hatfield |
| D859,801 S | 9/2019 | Jenkins et al. |
| D860,614 S | 9/2019 | Bishoff |
| D862,051 S | 10/2019 | Goussev et al. |
| D862,866 S | 10/2019 | Albrecht et al. |
| 10,426,226 B2 | 10/2019 | Guyan et al. |
| 10,434,706 B2 | 10/2019 | Robeson et al. |
| D869,830 S | 12/2019 | Lucas et al. |
| D871,033 S | 12/2019 | Nikolic |
| D872,426 S | 1/2020 | Taylor |
| D873,546 S | 1/2020 | Henrichot |
| D876,056 S | 2/2020 | Henrichot |
| D878,016 S | 3/2020 | Henrichot |
| D879,428 S | 3/2020 | Braun et al. |
| D879,434 S | 3/2020 | Fick et al. |
| 10,575,588 B2 | 3/2020 | Perrault et al. |
| D880,120 S | 4/2020 | Fick et al. |
| D880,122 S | 4/2020 | Fick et al. |
| D880,131 S | 4/2020 | Fick et al. |
| D882,227 S | 4/2020 | Braun et al. |
| 10,639,861 B2 | 5/2020 | Le et al. |
| D890,485 S | 7/2020 | Perrault et al. |
| 2002/0078598 A1 | 6/2002 | Bell |
| 2004/0087230 A1 | 5/2004 | Wildeman |
| 2006/0201028 A1 | 9/2006 | Chan et al. |
| 2007/0011914 A1 | 1/2007 | Keen et al. |
| 2007/0043582 A1 | 2/2007 | Peveto et al. |
| 2008/0289218 A1 | 11/2008 | Nakano |
| 2009/0126225 A1 | 5/2009 | Jarvis |
| 2009/0139112 A1 | 6/2009 | Garneau |
| 2009/0183392 A1 | 7/2009 | Shane |
| 2009/0293309 A1 | 12/2009 | Keating et al. |
| 2010/0122471 A1 | 5/2010 | Edington et al. |
| 2010/0170106 A1 | 7/2010 | Brewer et al. |
| 2010/0199520 A1 | 8/2010 | Dua et al. |
| 2010/0251565 A1 | 10/2010 | Litchfield et al. |
| 2010/0281714 A1 | 11/2010 | Carboy et al. |
| 2011/0099855 A1 | 5/2011 | Cho |
| 2012/0117825 A9 | 5/2012 | Jarvis |
| 2012/0178259 A1 | 7/2012 | Miyazaki et al. |
| 2012/0180335 A1 | 7/2012 | Mahoney |
| 2012/0186107 A1 | 7/2012 | Crary et al. |
| 2013/0118036 A1 | 5/2013 | Gibson |
| 2013/0145653 A1 | 6/2013 | Bradford |
| 2013/0171019 A1 | 7/2013 | Gessler et al. |
| 2013/0292862 A1 | 11/2013 | Joyce |
| 2013/0295212 A1 | 11/2013 | Chen et al. |
| 2014/0020191 A1 | 1/2014 | Jones et al. |
| 2014/0026773 A1 | 1/2014 | Miller |
| 2014/0029030 A1 | 1/2014 | Miller |
| 2014/0109441 A1 | 4/2014 | Mcdowell et al. |
| 2014/0150297 A1 | 6/2014 | Holmes et al. |
| 2014/0182170 A1 | 7/2014 | Wawrousek et al. |
| 2014/0223783 A1 | 8/2014 | Wardlaw et al. |
| 2014/0226773 A1 | 8/2014 | Toth et al. |
| 2014/0259779 A1 | 9/2014 | Hashish et al. |
| 2014/0259787 A1 | 9/2014 | Guyan et al. |
| 2014/0259788 A1 | 9/2014 | Dojan et al. |
| 2014/0259789 A1 | 9/2014 | Dojan et al. |
| 2014/0299009 A1 | 10/2014 | Miller et al. |
| 2014/0300675 A1 | 10/2014 | Miller et al. |
| 2014/0300676 A1 | 10/2014 | Miller et al. |
| 2014/0310991 A1 | 10/2014 | Greene et al. |
| 2015/0033577 A1 | 2/2015 | Dahl et al. |
| 2015/0089841 A1 | 4/2015 | Smaldone et al. |
| 2015/0181976 A1 | 7/2015 | Cooper et al. |
| 2015/0223560 A1 | 8/2015 | Wawrousek et al. |
| 2015/0245686 A1 | 9/2015 | Cross |
| 2015/0331402 A1 | 11/2015 | Lin et al. |
| 2015/0351493 A1* | 12/2015 | Ashcroft ............... B33Y 80/00 36/132 |
| 2015/0360419 A1 | 12/2015 | Willis et al. |
| 2016/0051009 A1 | 2/2016 | Kormann et al. |
| 2016/0122493 A1 | 5/2016 | Farris et al. |
| 2016/0137839 A1 | 5/2016 | Rolland et al. |
| 2016/0160077 A1 | 6/2016 | Rolland et al. |
| 2016/0180440 A1 | 6/2016 | Dibenedetto et al. |
| 2016/0288376 A1 | 10/2016 | Sun et al. |
| 2016/0295971 A1 | 10/2016 | Arnese et al. |
| 2016/0324260 A1* | 11/2016 | Guyan .................. A43B 13/20 |
| 2016/0324261 A1 | 11/2016 | Guyan |
| 2016/0360828 A1 | 12/2016 | Guyan |
| 2016/0374428 A1* | 12/2016 | Kormann ........... A43B 23/0215 36/28 |
| 2017/0129167 A1 | 5/2017 | Castanon |
| 2017/0129169 A1 | 5/2017 | Batchelder et al. |
| 2017/0150778 A1 | 6/2017 | Youngs et al. |
| 2018/0014606 A1 | 1/2018 | Mokos |
| 2018/0049514 A1* | 2/2018 | Guyan ................ A43B 13/181 |
| 2018/0070736 A1* | 3/2018 | Achten ................ A47C 23/002 |
| 2018/0103719 A1 | 4/2018 | Chen |
| 2018/0126630 A1 | 5/2018 | Panzer et al. |
| 2018/0243976 A1 | 8/2018 | Feller |
| 2018/0271211 A1* | 9/2018 | Perrault .................. A43B 1/10 |
| 2018/0271213 A1* | 9/2018 | Perrault .................. A43D 1/02 |
| 2018/0290374 A1 | 10/2018 | Willis et al. |
| 2018/0303199 A1* | 10/2018 | Guyan .................. A43B 13/02 |

(56) References Cited

U.S. PATENT DOCUMENTS

| | | |
|---|---|---|
| 2018/0368518 A1 | 12/2018 | Re et al. |
| 2019/0069632 A1 | 3/2019 | Meschter |
| 2019/0098960 A1 | 4/2019 | Weisskopf et al. |
| 2019/0160733 A1 | 5/2019 | Mirkin et al. |
| 2019/0223543 A1 | 7/2019 | Tamm et al. |
| 2019/0223551 A1 | 7/2019 | Hoffer et al. |
| 2019/0269200 A1 | 9/2019 | Tseng |
| 2019/0289960 A1 | 9/2019 | Loveder |
| 2020/0093221 A1 | 3/2020 | Caldwell et al. |
| 2020/0156308 A1 | 5/2020 | Ramos et al. |
| 2020/0329815 A1 | 10/2020 | Schmid |
| 2021/0195989 A1 | 7/2021 | Iwasa et al. |
| 2021/0195995 A1 | 7/2021 | Sakamoto et al. |

FOREIGN PATENT DOCUMENTS

| | | | |
|---|---|---|---|
| CN | 203378623 U | | 1/2014 |
| CN | 209391169 U | | 9/2019 |
| CN | 209403686 U | | 9/2019 |
| CN | 110859355 A | * | 3/2020 |
| EP | 0526892 A2 | | 2/1993 |
| EP | 2564719 A1 | | 3/2013 |
| EP | 2424398 B1 | | 12/2015 |
| EP | 3013171 A1 | | 5/2016 |
| EP | 3165109 A1 | | 5/2017 |
| ES | 2442448 A1 | | 2/2014 |
| ES | 2578730 A1 | | 7/2016 |
| JP | 2002238609 A | | 8/2002 |
| JP | 2011251190 A | | 12/2011 |
| JP | 2014151201 A | | 8/2014 |
| JP | 3192899 U | | 9/2014 |
| WO | 2010126708 A2 | | 11/2010 |
| WO | 2014008331 A2 | | 1/2014 |
| WO | 2014015037 A2 | | 1/2014 |
| WO | WO-2014009587 A1 | | 1/2014 |
| WO | 2014100462 A1 | | 6/2014 |
| WO | 2015164234 A1 | | 10/2015 |
| WO | 2015169941 A1 | | 11/2015 |
| WO | 2015169942 A1 | | 11/2015 |
| WO | 2016066750 A1 | | 5/2016 |
| WO | 2017210298 A1 | | 12/2017 |
| WO | WO-2021169804 A1 | | 9/2021 |

OTHER PUBLICATIONS

Green, D., Adidas is finally bringing 3D-printed shoes into the mainstream, Business Insider.com, Dennis Green, Retrieved from the Internet: (URL:https://www.businessinsider.com/adidas-releases-futurecraft-4d-shoe-2017-4/commerce-on-business-insider), (Year: 2017).

Janusziewicz, R., et al., "Layerless Fabrication With Continuous Liquid Interface Production," PNAS 113(42):11703-11708, University of Illinois (Oct. 2016).

Nikolic, I., Reebok Flexagon Training Shoes, Behance.net, Ilija Nikolic, Retrieved from the Internet (URL: https://www.behance.net/gallery/68953047/REEBOK-FLEXAGON-Training-Shoes?tracking_source=curated_galleries_list) 2018, 10 pages.

Panetta., et al., "Elastic Textures for Additive Fabrication," ACM Transactions on Graphics 34(4), Article No. 135, (Aug. 2015).

Pearson, D., Adidas is giving Olympic athletes its first-ever 3D-printed shoes,Highsnobiety.com, Retrieved from the Internet: (URL:https://www.highsnobiety.com/2016/08/11/adidas-3d-printed-shoes-olympics/), (Year: 2016).

Reebok Flexagon, Retrieved from the Internet (URL: https://www.reebok.com/us/reebok-flexagon/CN2583.html), 2018.

Richard, B., Here's what 3D printed Future Craft adidas Yeezy boosts would look like Yeezys geared up for the future Retrieved from the Internet: (URL:https://solecollector.com/news/2015/11/adidas-yeezy-futurecraft-3d-print), (Year: 2015).

Tumbleston, J.R., et al., "Continuous Liquid Interface Production of 3d Objects," Science 347(6228):1349-1352, American Association for the Advancement of Science (Mar. 2015).

Worman, C., Top Tennis Shoes Featuring a 6-Month Outsole Warranty, Retrieved from the Internet (URL: https://blogs.tennisexpress.com/blogs/top-tennis-shoes-featuring- - a-6-month-outsole-warranty/), (Year: 2018), 11 pages.

* cited by examiner

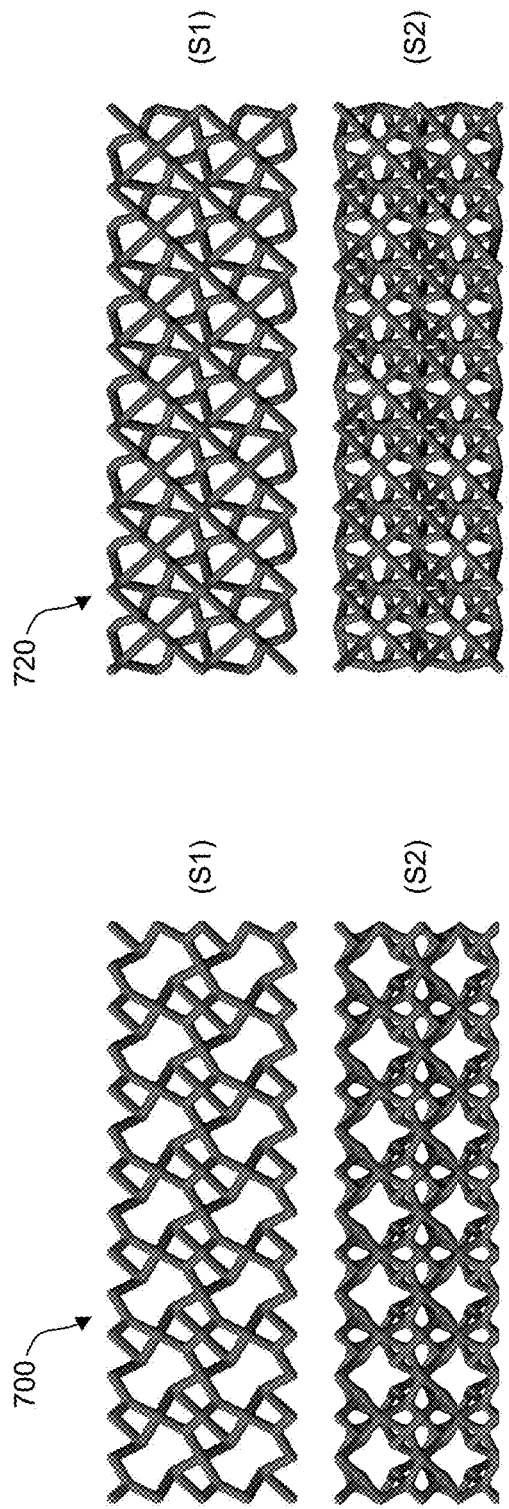
FIG. 7A
FIG. 7B
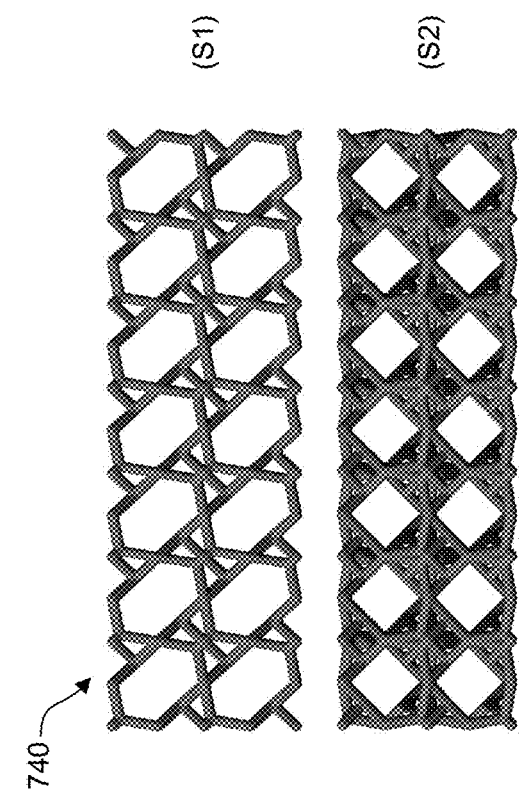
FIG. 7C

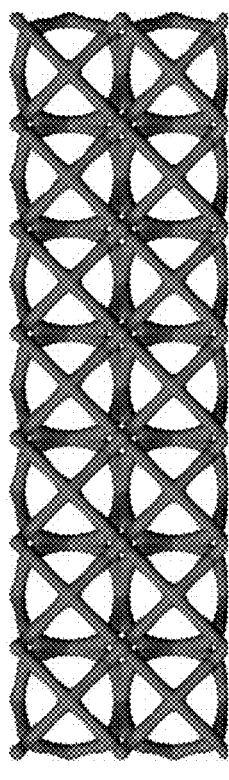
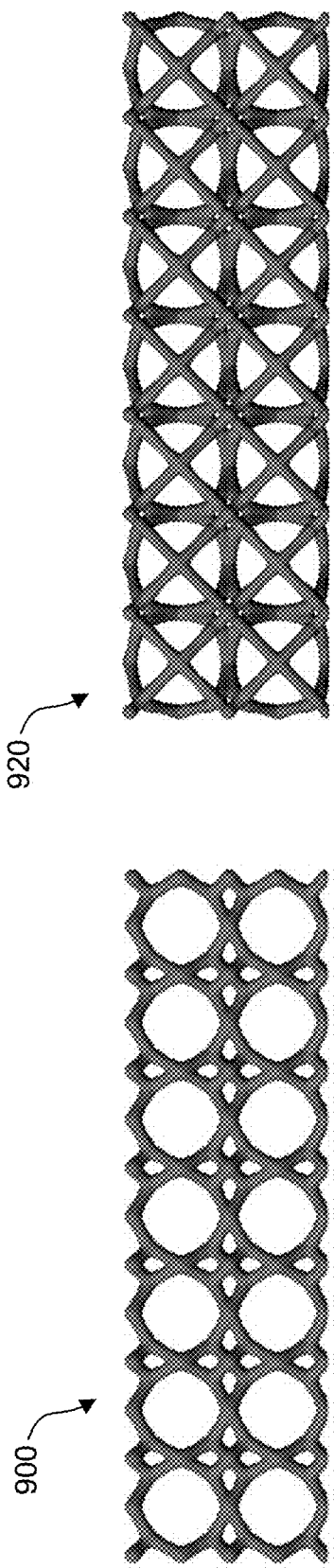
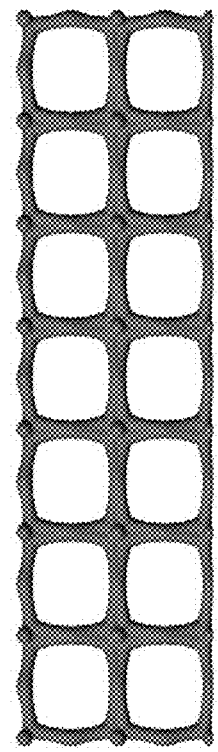
FIG. 9B
FIG. 9A
FIG. 9C

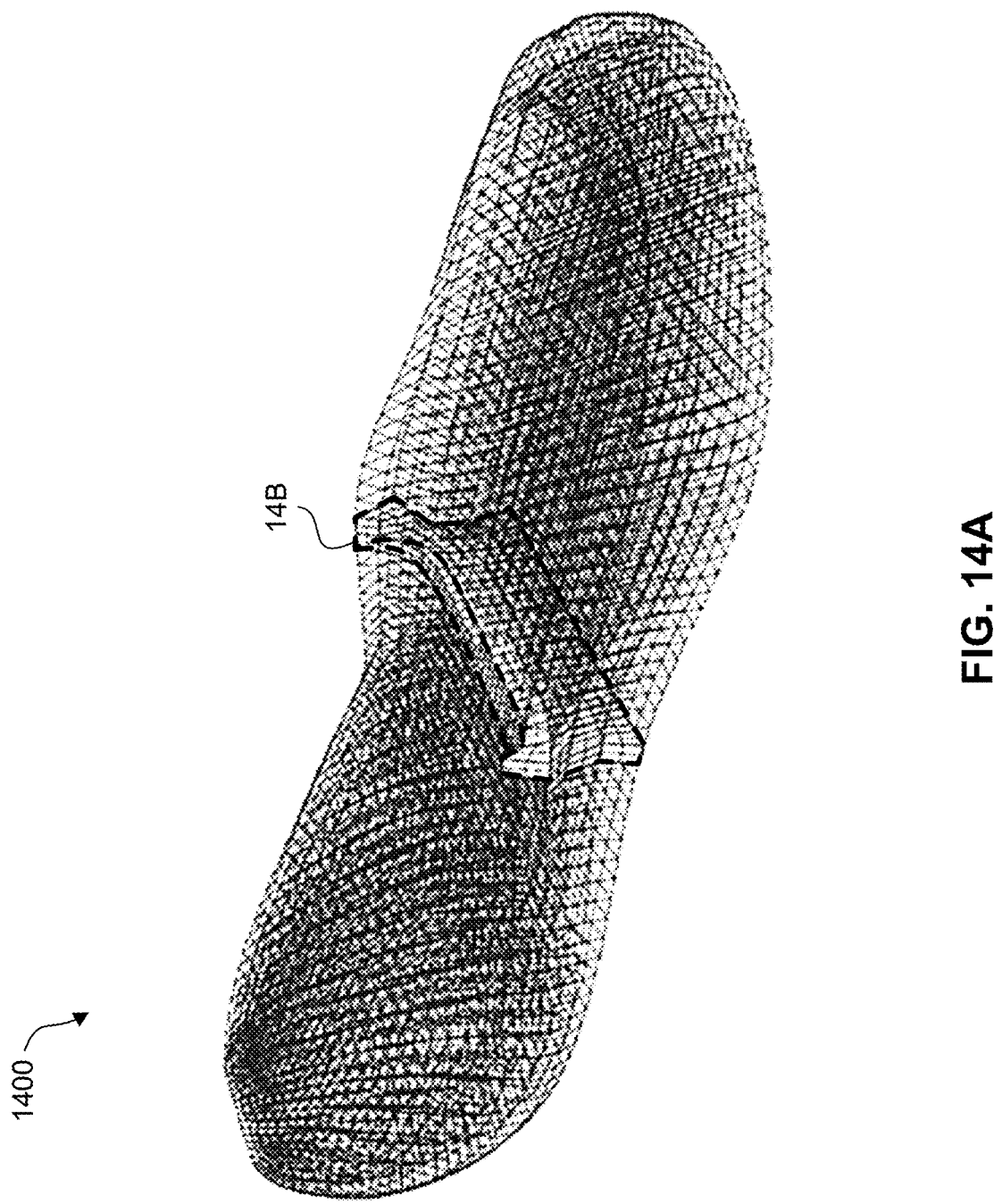

FOOTWEAR MIDSOLE WITH 3-D PRINTED MESH HAVING AN ANISOTROPIC STRUCTURE AND METHODS OF MAKING THE SAME

FIELD

The described embodiments generally relate to soles for articles of footwear. More particularly, described embodiments relate to soles for articles of footwear including a midsole with an anisotropic structure configured to provide desired mechanical characteristics to the midsole.

BACKGROUND

The human foot is a complex and remarkable piece of machinery, capable of withstanding and dissipating many impact forces. The natural padding of fat at the heel and forefoot, as well as the flexibility of the arch, help to cushion the foot. Although the human foot possesses natural cushioning and rebounding characteristics, the foot alone is incapable of effectively overcoming many of the forces encountered during every day activity. Unless an individual is wearing shoes that provide proper cushioning and support, the soreness and fatigue associated with every day activity is more acute, and its onset may be accelerated. This discomfort for the wearer may diminish the incentive for further activity. Equally important, inadequately cushioned footwear can lead to injuries such as blisters; muscle, tendon, and ligament damage; and bone stress fractures. Improper footwear can also lead to other ailments, including back pain.

Individuals are often concerned with the amount of cushioning an article of footwear provides. This is true for articles of footwear worn for non-performance activities, such as a leisurely stroll, and for performance activities, such as running, because throughout the course of an average day, the feet and legs of an individual are subjected to substantial impact forces. When an article of footwear contacts a surface, considerable forces may act on the article of footwear and, correspondingly, the wearer's foot. The sole of an article of footwear functions, in part, to provide cushioning to the wearer's foot and to protect it from these forces.

Proper footwear should be durable, comfortable, and provide other beneficial characteristics for an individual. Therefore, a continuing need exists for innovations in footwear.

BRIEF SUMMARY

A first aspect (1) of the present application is directed to a sole for an article of footwear, the sole including: a three-dimensional mesh including: a plurality of interconnected unit cells, each interconnected unit cell having a plurality of struts defining a three-dimensional shape and a plurality of nodes at which one or more struts are connected, where each unit cell includes a soft sub-cell and a stiff sub-cell.

In a second aspect (2), each unit cell according to the first aspect (1) includes a plurality of soft sub-cells and a plurality of stiff sub-cells.

In a third aspect (3), each unit cell according to the first aspect (1) or the second aspect (2) includes: a plurality of soft sub-cells and a plurality of stiff sub-cells, an upper-forward quadrant including at least one of the plurality of soft sub-cells, an upper-rearward quadrant including at least one of the plurality of stiff sub-cells, a lower-forward quadrant including at least one of the plurality of stiff sub-cells, and a lower-rearward quadrant including at least one of the plurality of soft sub-cells.

In a fourth aspect (4), the upper-forward quadrant according to the third aspect (3) includes two of the soft sub-cells, the upper-rearward quadrant according to the third aspect (3) includes two of the stiff sub-cells, the lower-forward quadrant according to the third aspect (3) includes two of the stiff sub-cells, and the lower-rearward quadrant according to the third aspect (3) includes two of the soft sub-cells.

In a fifth aspect (5), each unit cell according to any one of aspects (1)-(4) includes eight sub-cells.

In a sixth aspect (6), the eight sub-cells according to the fifth aspect (5) include four soft sub-cells and four stiff sub-cells.

In a seventh aspect (7), the eight sub-cells according to the fifth aspect (5) include a plurality of soft sub-cells and a plurality of stiff sub-cells.

In an eighth aspect (8), the eight sub-cells according to the seventh aspect (7) include: an upper-forward-medial soft sub-cell, an upper-forward-lateral soft sub-cell, an upper-rearward-medial stiff sub-cell, an upper-rearward-lateral stiff sub-cell, a lower-forward-medial stiff sub-cell, a lower-forward-lateral stiff sub-cell, a lower-rearward-medial soft sub-cell, and a lower-rearward-lateral soft-sub cell.

In a ninth aspect (9), the soft sub-cell according to the first aspect (1) includes a sub-cell for a first lattice structure and wherein the stiff sub-cell includes a sub-cell for a second lattice structure different from the first lattice structure.

In a tenth aspect (10), the first lattice structure according to the ninth aspect (9) has a first modeled compressive modulus and the second lattice structure according to the ninth aspect (9) has a second modeled compressive modulus 15% or more greater than the first modeled compressive modulus.

In an eleventh aspect (11), the first lattice structure according to the ninth aspect (9) or the tenth aspect (10) has a first modeled shear modulus and the second lattice structure according to the ninth aspect (9) or the tenth aspect (10) has a second modeled shear modulus 15% or more greater than the first modeled shear modulus.

In a twelfth aspect (12), the first lattice structure according to any one of aspects (9)-(11) is an isotropic lattice structure and the second lattice structure according to any one of aspects (9)-(11) is an isotropic lattice structure.

In a thirteenth aspect (13), the three-dimensional mesh according to any one of aspects (1)-(12) includes: a lattice shear modulus measured in a forward direction, and a lattice shear modulus measured in a rearward direction greater than the lattice shear modulus measured in the forward direction.

In a fourteenth aspect (14), the lattice shear modulus measured in a rearward direction according to the thirteenth aspect (13) is greater than the lattice shear modulus measured in the forward direction by 10% or more.

In a fifteenth aspect (15) the three-dimensional mesh according to the thirteenth aspect (13) includes a ratio of the lattice shear modulus measured in the rearward direction to the lattice shear modulus in the forward direction ranging from 1.1 to 4.

A sixteenth aspect (16) of the present application is directed to a sole for an article of footwear, the sole including: a three-dimensional mesh including: a plurality of interconnected unit cells, each interconnected unit cell having a plurality of struts defining a three-dimensional shape and a plurality of nodes at which one or more struts are connected; and a mechanically anisotropic region including:

a first lattice shear modulus measured in a forward direction, and a second lattice shear modulus measured in a rearward direction opposite the forward direction and greater than the first lattice shear modulus.

In a seventeenth aspect (17), the second lattice shear modulus according to the sixteenth aspect (16) is greater than the first lattice shear modulus by 10% or more.

In an eighteenth aspect (18), the mechanically anisotropic region according to the sixteenth aspect (16) or the seventeenth aspect (17) further includes a third lattice shear modulus measured in a transverse direction orthogonal to the forward direction, the first lattice shear modulus is less than the third lattice shear modulus, and the second lattice shear modulus is greater than the third lattice shear modulus.

In a nineteenth aspect (19), the mechanically anisotropic region according to any one of aspects (16)-(18) includes a lattice compressive modulus of 10 N/mm or more.

In a twentieth aspect (20), the mechanically anisotropic region according to any one of aspects (16)-(18) includes a lattice compressive modulus ranging from 10 N/mm to 25 N/mm.

In a twenty-first aspect (21), the mechanically anisotropic region according to any one of aspects (16)-(20) includes a lattice displacement in the forward direction of 3.5 mm or more.

In a twenty-second aspect (22), the mechanically anisotropic region according to any one of aspects (16)-(20) includes a lattice displacement in the forward direction ranging from 3.5 mm to 10 mm.

In a twenty-third aspect (23), the mechanically anisotropic region according to any one of aspects (16)-(22) is predisposed to deform forward under a vertical load.

A twenty-fourth aspect (24) of the present application is directed to a sole for an article of footwear, the sole including: a three-dimensional mesh including: a plurality of interconnected unit cells, each interconnected unit cell having a plurality of struts defining a three-dimensional shape and a plurality of nodes at which one or more struts are connected, where a plurality of the interconnected unit cells at a perimeter sidewall of the three-dimensional mesh define a perimeter structure including: a plurality of eight-sided regions arranged directly adjacent to each other and having substantially the same size, each of the plurality of eight-sided regions defined by eight border struts, and the plurality of eight-sided regions including: a first region having four openings defined by four interior struts connected at an interior node, and a second region having a single opening defined by the eight border struts.

In a twenty-fifth aspect (25), the plurality of eight-sided regions defined by eight border struts according to the twenty-fourth aspect (24) include a plurality of the first regions having four openings defined by four interior struts connected at an interior node, and a plurality of the second regions having a single opening defined by the eight border struts.

In a twenty-sixth aspect (26), the plurality of the first regions according to the twenty-fifth aspect (25) are arranged in a first row extending in a longitudinal direction between a forefoot end of the sole and a heel end of the sole, and the plurality of the second regions according to the twenty-fifth aspect (25) are arranged in a second row extending in the longitudinal direction between the forefoot end of the sole and the heel end of the sole.

In a twenty-seventh aspect (27), the plurality of eight-sided regions according to any one of aspects (24)-(26) each have a bowtie shape.

In a twenty-eighth aspect (28), the perimeter structure according to any one of aspects (24)-(27) includes the structure shown in FIG. 17.

A twenty-ninth aspect (29) of the present application is directed to a sole for an article of footwear, the sole including: a three-dimensional mesh including: a plurality of interconnected unit cells, each interconnected unit cell having a plurality of struts defining a three-dimensional shape and a plurality of nodes at which one or more struts are connected; and a color coating on a portion of the three-dimensional mesh, where the plurality of interconnected unit cells define at least a portion of a perimeter sidewall of the three-dimensional mesh, and the color coating is not coated on the at least a portion of the perimeter sidewall.

In a thirtieth aspect (30), the three-dimensional mesh according to the twenty-ninth aspect (29) includes a transverse stack of the unit cells, the transverse stack including an exterior column of unit cells defining at least a portion of the perimeter sidewall of the three-dimensional mesh and an interior column of unit cells disposed interior of the exterior column of unit cells.

In a thirty-first aspect (31), the color coating according to the thirtieth aspect (30) is coated on at least a portion of the interior column of unit cells and is not coated on the exterior column of unit cells.

In a thirty-second aspect (32), the transverse stack according to the thirtieth aspect (30) or the thirty-first aspect (31) extends from a medial side to a lateral side of the three-dimensional mesh.

In a thirty-third aspect (33), the plurality of interconnected unit cells according to any one of aspects (29)-(32) have a first color and the color coating has a second color different from the first color.

In a thirty-fourth aspect (34), the first color according to the thirty-third aspect (33) is selected from the group consisting of: red, crimson, maroon, magenta, pink, orange, yellow, gold, chartreuse, green, blue, navy, aqua, teal, cerulean, indigo, violet, purple, brown, black, grey, white, beige, silver, or taupe, and the second color according to the thirty-third aspect (33) is selected from the group consisting of: red, crimson, maroon, magenta, pink, orange, yellow, gold, chartreuse, green, blue, navy, aqua, teal, cerulean, indigo, violet, purple, brown, black, grey, white, beige, silver, or taupe.

In a thirty-fifth aspect (35), the color coating according to any one of aspects (29)-(34) includes a powder coating.

In a thirty-sixth aspect (36), the color coating according to any one of aspects (29)-(34) includes a paint coating.

In a thirty-seventh aspect (37), the color coating according to any one of aspects (29)-(36) does not fill spaces between the plurality of struts.

In a thirty-eighth aspect (38), the color coating according to any one of aspects (29)-(37) does not extend between individual struts not connected to each other at one of the plurality of nodes.

BRIEF DESCRIPTION OF THE DRAWINGS

FIGS. 7A-7C show lattice structures according to some embodiments.

FIGS. 9A-9C show isotropic lattice structures for stiff sub-cells according to some embodiments.

FIG. 14A is a perspective view of an exemplary warped cubic lattice framework.

DETAILED DESCRIPTION

Figure 1:
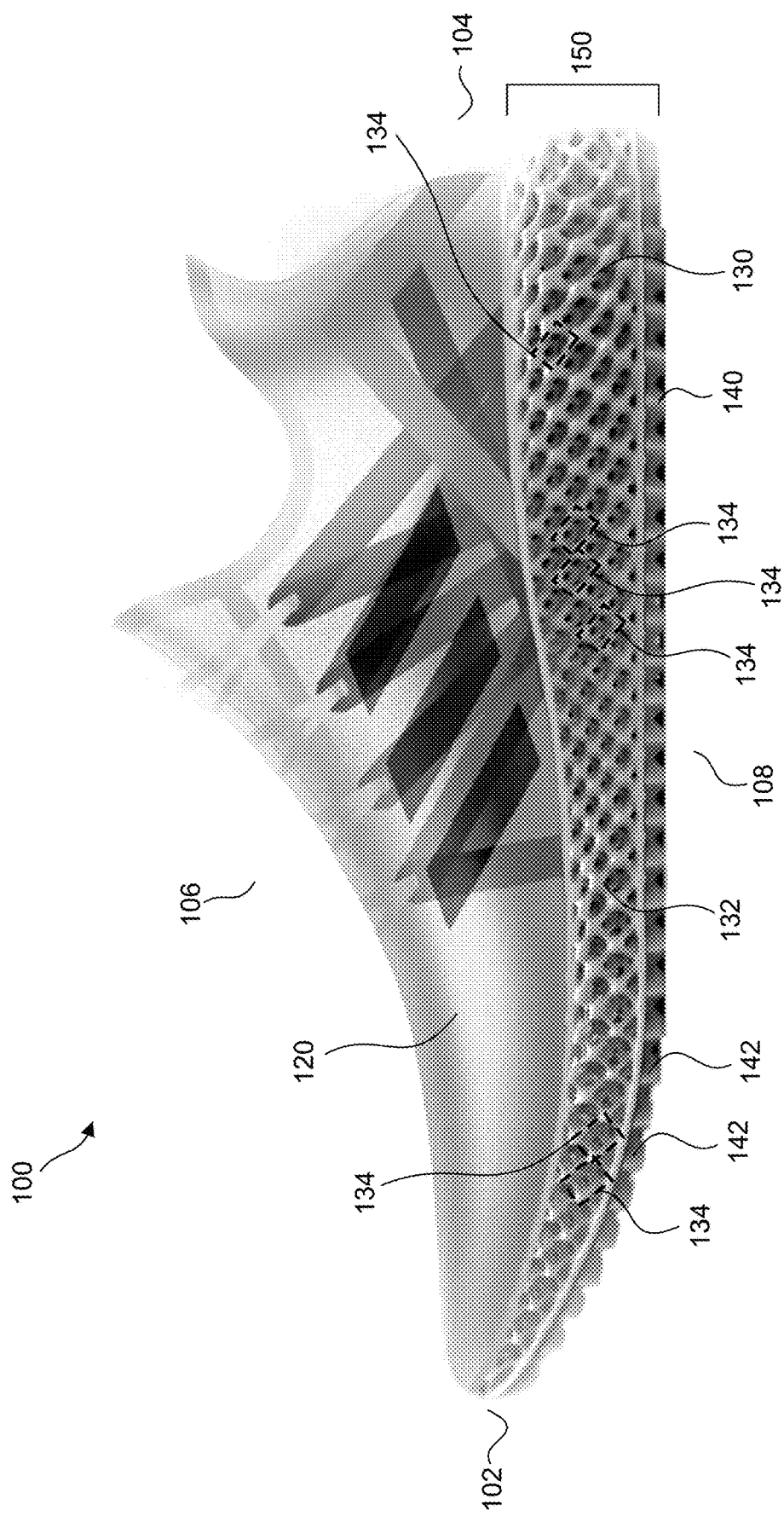
FIG. 1 is a side view of an article of footwear according to some embodiments.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An article of footwear has many purposes. Among other things, an article of footwear can cushion a wearer's foot, support a wearer's foot, protect a wearer's foot (e.g., from injury), and optimize the performance of a wearer's foot. Each of these purposes, alone or in combination, provides for a comfortable article of footwear suitable for use in a variety of scenarios (e.g., exercise and every day activities). The features of an article of footwear (e.g., shape, components, and materials used to make footwear) can be altered to produce desired characteristics, for example, cushioning, support, stability, ride, and propulsion characteristics.

Stability provided by an article of footwear can protect a wearer's foot from injury, such as spraining his or her ankle. Propulsion provided by an article of footwear can optimize the performance of a wearer's foot by, for example, maximizing the energy transfer from the individual's foot to the surface his or her foot is in contact with (e.g., the ground) via the article of footwear. Maximizing the energy transfer between the individual's foot and a surface (i.e., reducing energy lost via and/or absorbed by an article of footwear) can help an athlete, for example, accelerate faster, maintain a higher maximum speed, change directions faster, and jump higher. Cushioning and ride characteristics provided by an article of footwear can provide comfort for an individual during an athletic or everyday activity.

Three-dimensional meshes described herein can leverage characteristics of unit cells that make up the three-dimensional meshes to create mechanically anisotropic properties. These mechanically anisotropic properties can be designed to provide desired mechanical characteristics for a three-dimensional mesh defining all or a portion of a sole. One such property that can be designed to achieve specific mechanical characteristics is "lattice shear modulus." In some embodiments, all or a portion of a three-dimensional mesh can be designed to include anisotropic lattice shear moduli that impart desired mechanical characteristics to the three-dimensional mesh. In some embodiments, a plurality of regions of a three-dimensional mesh can be designed to include anisotropic lattice shear moduli that impart desired mechanical characteristics to the different regions of the three-dimensional mesh. Desired mechanical characteristics for a three-dimensional mesh may in turn create desired footwear sole characteristics, for example, cushioning, propulsion, stability, ride, and/or weight characteristics.

In particular embodiments, mechanically anisotropic properties of three-dimensional meshes as described herein can be designed to create forward propulsion when a sole including the three-dimensional mesh contacts the ground. In such embodiments, the three-dimensional mesh can include a lattice shear modulus measured in a forward direction that is less than a lattice shear modulus measured in a rearward direction. By designing a three-dimensional mesh in this fashion, the three-dimensional mesh can convert vertical loading energy into forward displacement, which propels a wearer's foot forward when a sole including the three-dimensional mesh contacts the ground during use. In other words, by designing a three-dimensional mesh in this fashion, the three-dimensional mesh can be predisposed to deform forwards when a sole including the three-dimensional mesh contacts the ground during use.

A three-dimensional mesh predisposed to deform in a particular direction (for example, in a forward direction) can offer multiple advantages for a wearer. For example, forward motion created by the three-dimensional mesh can yield improved efficiency while running. In other words, a three-dimensional mesh predisposed to deform forward can reduce the energy a wearer is required expend to continue his or her forward motion. As another example, a three-dimensional mesh predisposed to deform laterally (for example medially) can improve efficiency when a wearer changes direction by providing additional support under typical lateral loading conditions associated with, for example a lateral or medial cut during running.

Three-dimensional meshes described herein can include unit cells composed of different types of sub-cells, which can also be referred to as "partial unit cells." As described herein, unit cells can be constructed by assembling sub-cells in certain arrangements to create anisotropic lattice shear moduli. In particular embodiments, unit cells can be constructed by assembling sub-cells in certain arrangements to create anisotropic lattice shear moduli that create forward propulsion when a sole including the three-dimensional mesh contacts the ground.

As used herein, the term "three-dimensional mesh" means a three-dimensional structure comprising interconnected structural members defining a plurality of unit cells. The structural members, and thus the unit cells, can be connected at nodes. The unit cells can be arranged in a lattice configuration. For example, the interconnected structural members can be struts that are connected at nodes and that define unit cells arranged in a lattice configuration. Exemplary lattice configurations include, but are not limited to modified basic cubic lattices, modified body-centered cubic lattices, and modified face-centered cubic lattices. Modified lattices based on these lattice configurations can be created by combining sub-cells of these lattice configurations as described herein. Exemplary modified lattice configurations are shown in FIGS. 7A-7C.

As used herein, the term "lattice shear modulus" means the shear modulus (slope of the shear stress versus shear strain curve in the elastic region) for a three-dimensional mesh, or a portion thereof. A "lattice shear modulus" as described herein is measured using the following solid model simulation. A 7×7×2 unit cell puck composed of unit cells for the three-dimensional mesh is modeled using FEA (finite element analysis) modeling software. Suitable FEA modeling software includes Abaqus FEA modeling software. The 7×7×2 unit cell puck includes two layers of seven longitudinal rows of seven unit cells arranged adjacent to each other in the transverse direction as described herein. The unit cell puck is modeled as being sandwiched between and in contact with a top plate and a bottom plate. The following parameters were input into the FEA modeling software for the simulation: (1) material characteristics of the modeled struts for the unit cell puck (including density and tensile properties), (2) the loading conditions, and (3) the contact mechanics between the unit cell puck and the two plates (including the frictional properties).

Lattice shear moduli of the 7×7×2 unit cell puck in different directions is determined by a shear simulation with 45-degree load in the direction in which the lattice shear modulus is being evaluated. To determine the lattice shear modulus in a forward longitudinal direction, a 45-degree load in the forward longitudinal direction is modeled. To determine the lattice shear modulus in a rearward longitudinal direction, a 45-degree load in the rearward longitudinal direction is modeled. To determine the lattice shear modulus in a medial transverse direction, a 45-degree load in the medial transverse direction is modeled. To determine the lattice shear modulus in a lateral transverse direction, a 45-degree load in the lateral transverse direction is modeled.

Figure 10:
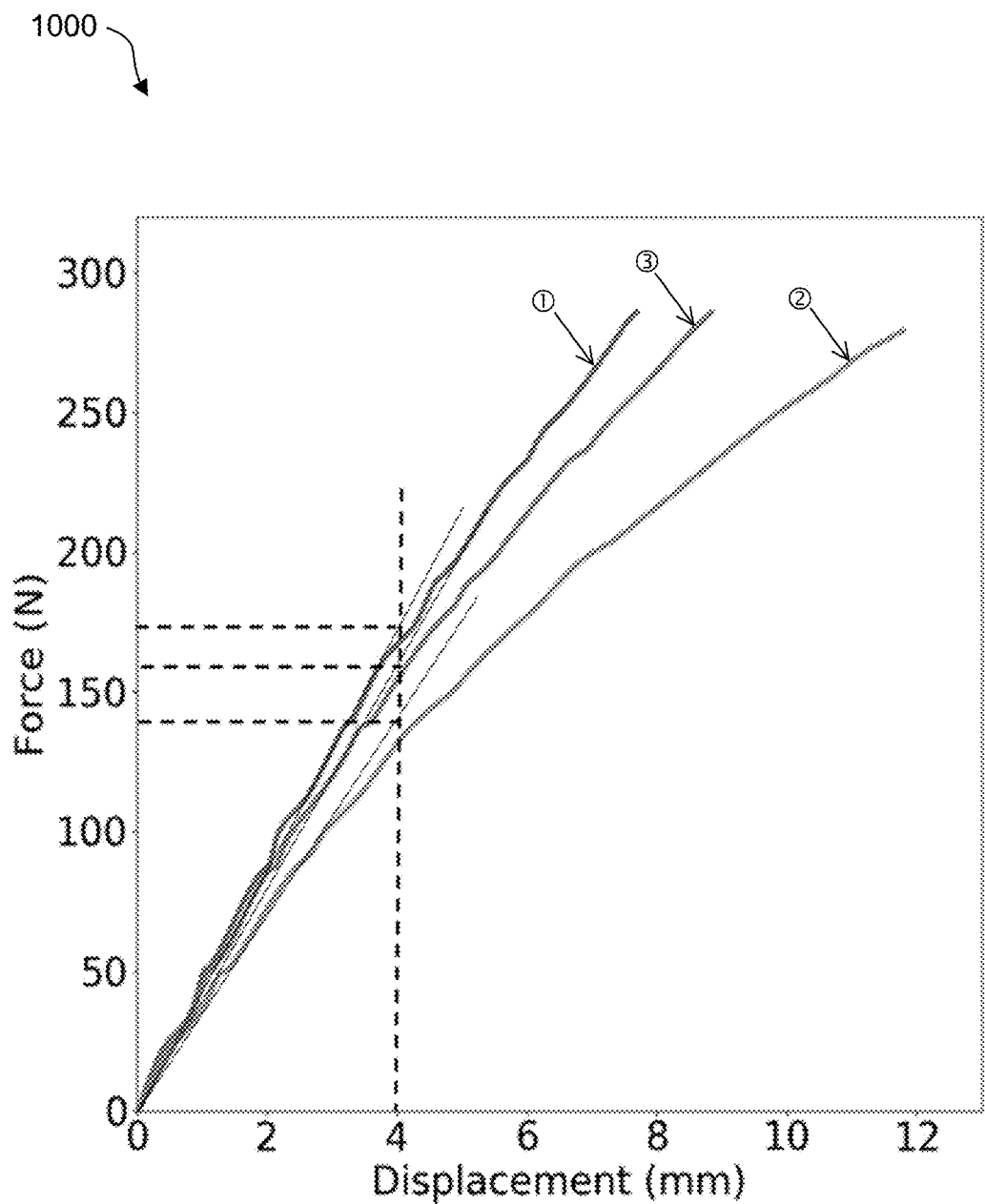
FIG. 10 is a graph of modeled force versus displacement for a lattice structure according to some embodiments.
Figure 11:
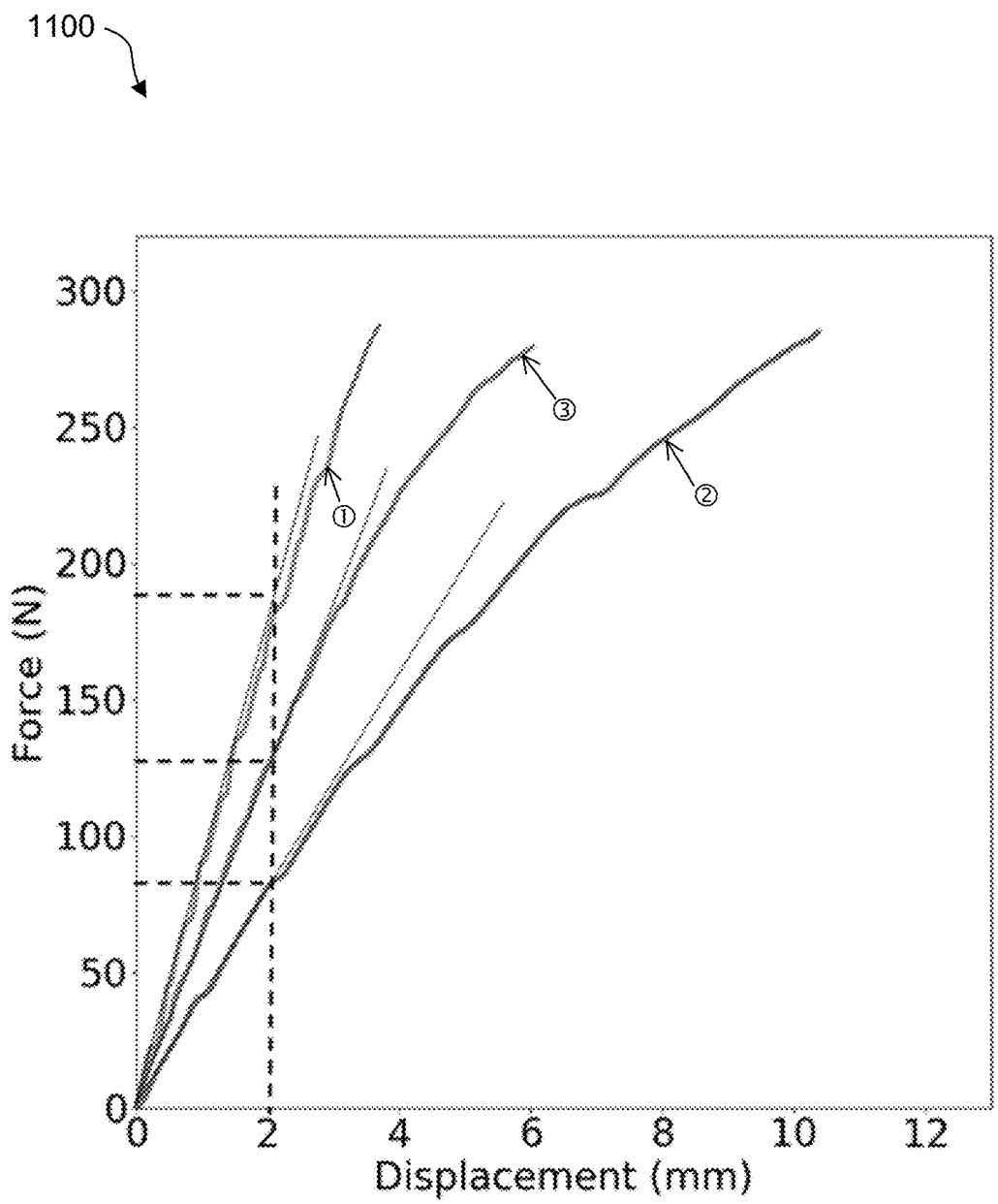
FIG. 11 is a graph of modeled force versus displacement for a lattice structure according to some embodiments.
Figure 12:
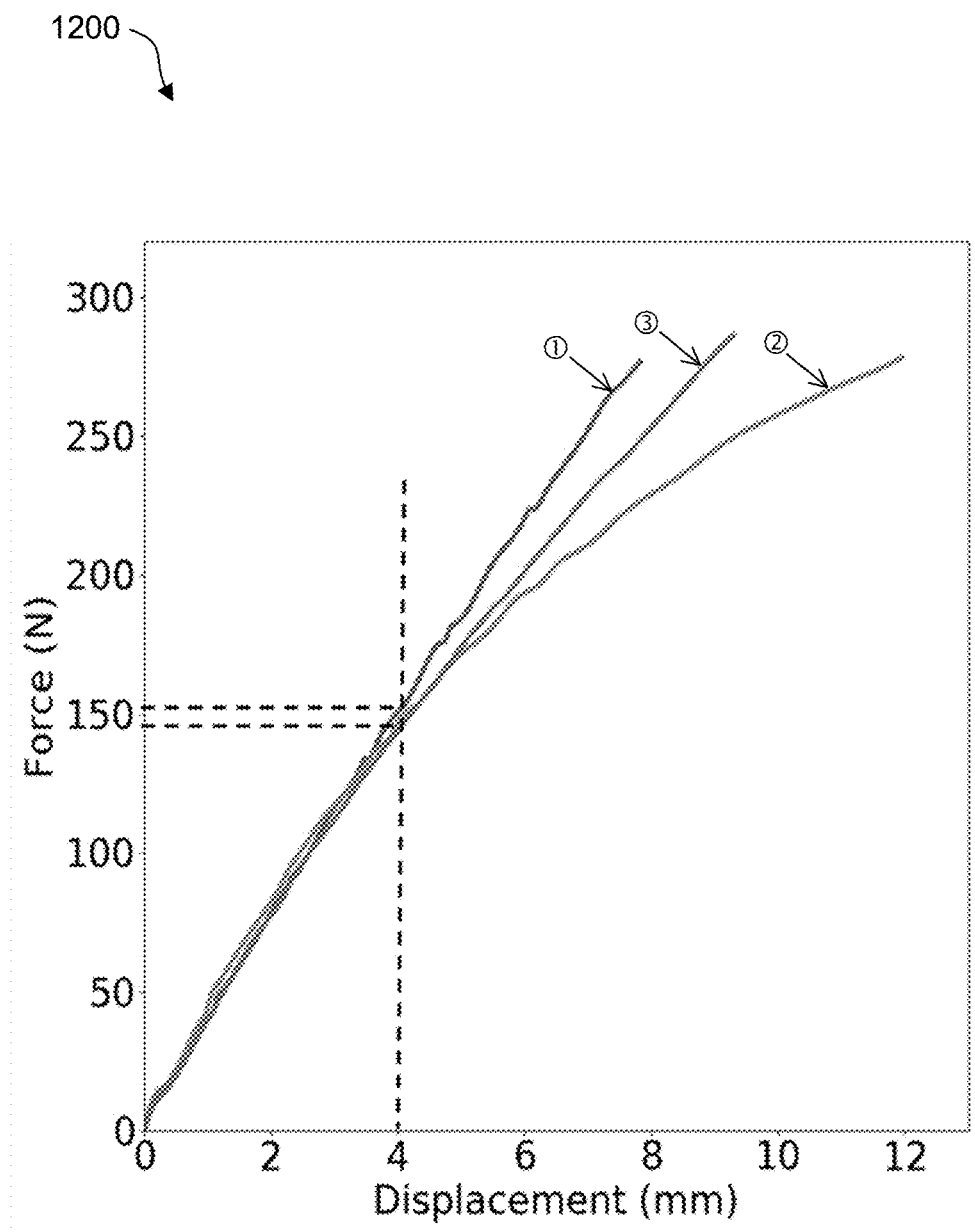
FIG. 12 is a graph of modeled force versus displacement for a lattice structure according to some embodiments.

The modeled stress-strain behavior of the 7×7×2 unit cell puck is plotted and the lattice shear modulus in the different directions is calculated by measuring the slope of the stress-strain curve in the elastic deformation region in the plot. FIGS. 10-12 show stress-strain plots for exemplary modeled 7×7×2 unit cell pucks.

Figure 13:
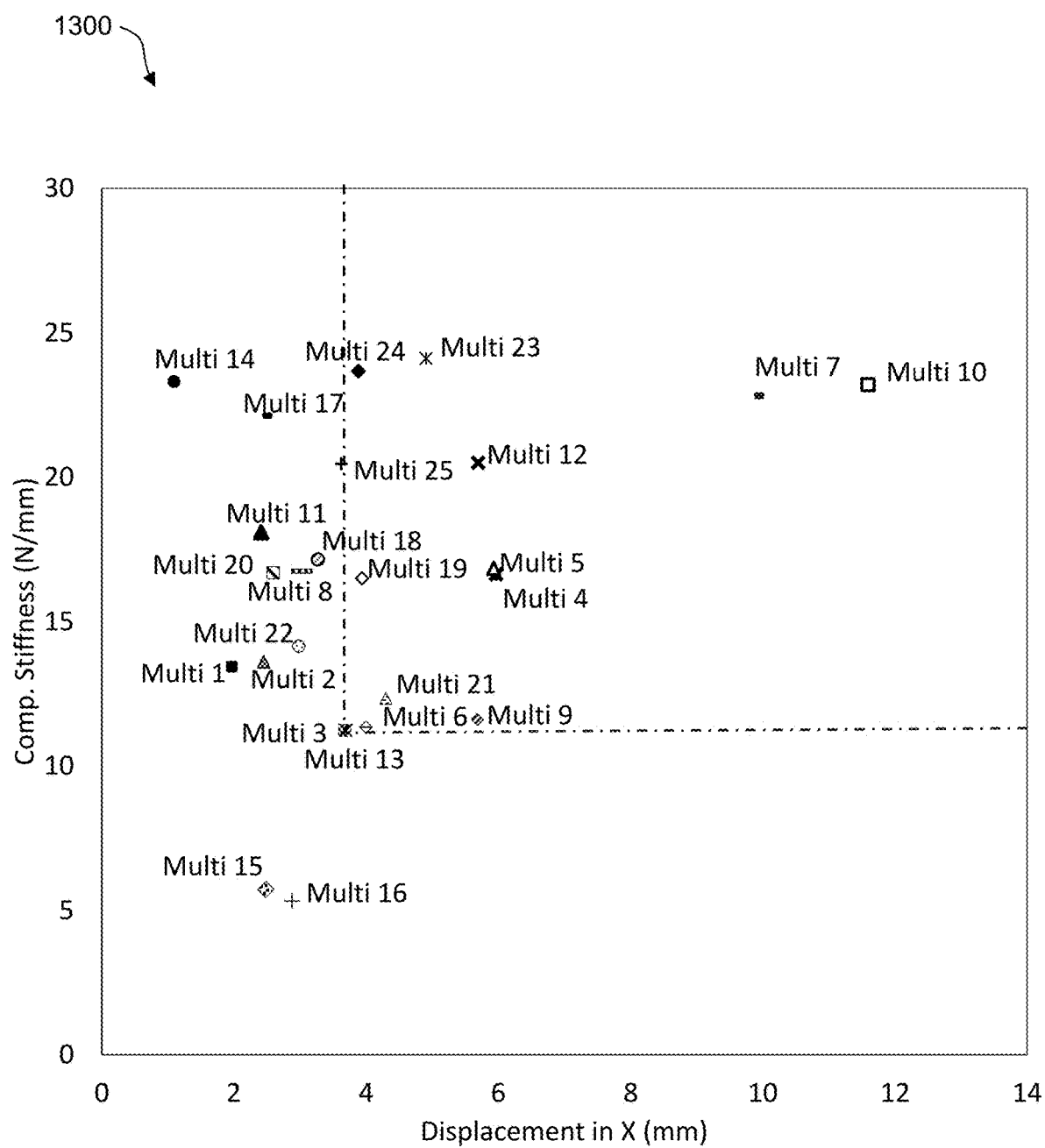
FIG. 13 is a graph of lattice compressive modulus versus displacement for various lattice structures.

In some cases, uniaxial compression loading can be modeled using the FEA modeling software to determine a "lattice compressive modulus" for a three-dimensional mesh, or a portion thereof. To determine the lattice compressive modulus for a three-dimensional mesh, the same model 7×7×2 unit cell puck is compressed at up to 50% strain. For this model, the tow plates are free to move in the longitudinal and transverse directions, and therefore the unit cell pucks are free to deform in the longitudinal and transverse directions. The modeled stress-strain behavior of the 7×7×2 unit cell puck is plotted and the lattice compressive modulus is calculated by measuring the slope of the stress-strain curve in the elastic deformation region in the plot. Further, this uniaxial compression loading can be used to determine a lattice displacement in the forward direction for a three-dimensional mesh, or a portion thereof. The lattice displacement in the forward direction is the amount the 7×7×2 puck deforms forward under the uniaxial compression loading, measured in millimeters. FIG. 13 shows a graph 1300 that plots the lattice compressive modulus ("Comp. Stiffness") versus the lattice displacement in the forward direction for various exemplary 7×7×2 unit cell pucks.

As used herein, "anisotropic" means dependent on direction. "Isotropic" generally means independent of direction. A material or component with a particular property that is isotropic at a particular point would have that same property regardless of measurement direction. For example, if Young's modulus is isotropic at a point, the value of the Young's modulus is the same regardless of the stretching direction used to measure Young's modulus.

An isotropic material or component has 2 independent elastic constants, often expressed as the Young's modulus and Poison's ratio of the material (although other ways to express may be used), which do not depend on position in such a material or component. A fully anisotropic material or component has 21 independent elastic constants. An orthotropic material or component has 9 independent elastic constants.

Orthotropic materials or components are a sub-set of anisotropic materials or components. By definition, an orthotropic material or component has at least two orthogonal planes of symmetry where material properties are independent of direction within each plane. An orthotropic material or component has nine independent variables (i.e. elastic constants) in its stiffness matrix. An anisotropic material or component can have up 21 elastic constants to define its stiffness matrix, if the material or component completely lacks planes of symmetry.

The mechanically anisotropic characteristic(s) of midsoles disclosed herein may offer a multitude of different options for customizing (tailoring) a midsole to an individual's, or group of individuals' needs. For example, lattice shear moduli may vary between different zones or portions on a midsole to provide desired characteristics (e.g., cushioning, support, stability, ride, and/or propulsion characteristics) for an individual, or group of individuals.

Midsoles including a three-dimensional mesh as discussed herein can be manufactured using one or more additive manufacturing methods. Additive manufacturing methods can allow for fabrication of three-dimensional objects without the need for a mold. By reducing or eliminating the need for molds, additive manufacturing methods can reduce costs for a manufacturer, and in turn a consumer, of a product (e.g., a shoe). Integral manufacturing of a midsole using additive manufacturing can make the assembly of separate elements of the midsole unnecessary. Similarly, an additively manufactured midsole can be fabricated from single material, which may facilitate easy recycling of the midsole.

Further, since molds may not be required, additive manufacturing methods facilitate customization of products. Additive manufacturing methods can be leveraged to provide customized and affordable footwear for individuals. Exemplary additive manufacturing techniques include for example, selective laser sintering, selective laser melting, selective heat sintering, stereo lithography, fused deposition modeling, or 3-D printing in general. Various additive manufacturing techniques related to articles of footwear are described for example in US 2009/0126225, WO 2010/126708, US 2014/0300676, US 2014/0300675, US 2014/0299009, US 2014/0026773, US 2014/0029030, WO 2014/008331, WO 2014/015037, US 2014/0020191, EP 2564719, EP 2424398, and US 2012/0117825. In some embodiments, the additive manufacturing process can include a continuous liquid interface production process. For example, the additive manufacturing process can include a continuous liquid interface production process as described in U.S. Pat. No. 9,453,142, issued on Sep. 27, 2016, which is hereby incorporated in its entirety by reference thereto.

In some embodiments, 3-D printing a three-dimensional mesh can include 3-D printing the mesh in an intermediate green state, shaping the mesh in the green state, and curing the green mesh in its final shape.

Techniques for producing an intermediate object from resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, Science 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, uS Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); K. Willis and B. Adzima, US Pat App Pub. No. US 2018/0290374 (Oct. 11, 2018) L. Robeson et al., PCT Patent Pub. No. WO 2015/164234 (see also U.S. Pat. Nos. 10,259,171 and 10,434,706); and C. Mirkin et al., PCT Patent Pub. No. WO 2017/210298 (see also US Pat. App. US 2019/0160733). The disclosures of these patents and applications are incorporated by reference herein in their entirety.

While stereolithography techniques such as CLIP can be preferred, it will be appreciated that other additive manufacturing techniques, such as jet printing (see, e.g., U.S. Pat. No. 6,259,962 to Gothait and US Patent App. Serial No. US 2020/0156308 to Ramos et al.) can also be used.

In some embodiments, a three-dimensional mesh can have anisotropic lattice shear moduli in forward and rearward directions as described herein. In some embodiments, one or more regions of a three-dimensional mesh can have anisotropic lattice shear moduli in forward and rearward directions as described herein. In some embodiments, the lattice shear modulus in the forward direction can be greater than the lattice shear modulus in the rearward direction. In some embodiments, the lattice shear modulus in the forward direction can be less than the lattice shear modulus in the rearward direction.

By tailoring the lattice shear modulus in the forward direction to be greater than or less than the lattice shear modulus in the rearward direction, a sole can be designed to have desired characteristics when acted on by vertical forces, forward forces, and rearward forces during use. For example, a lattice shear modulus in the rearward direction can be designed to be relatively stiff to provide propulsion while an athlete is accelerating in a forward direction (which applies a significant rearward force on a sole). A relatively stiff lattice shear modulus, and therefore a relatively flexible lattice shear modulus in the forward direction, can also provide forward propulsion by transforming vertical forces applied to the sole into forward displacement while an athlete is accelerating forward, thereby facilitating the forward acceleration. As another example, a lattice shear modulus in the forward direction can be designed to be relatively flexible to provide cushion during a heel strike or while an athlete is deaccelerating (both of which can apply a significant forward force on a sole).

Figure 2:
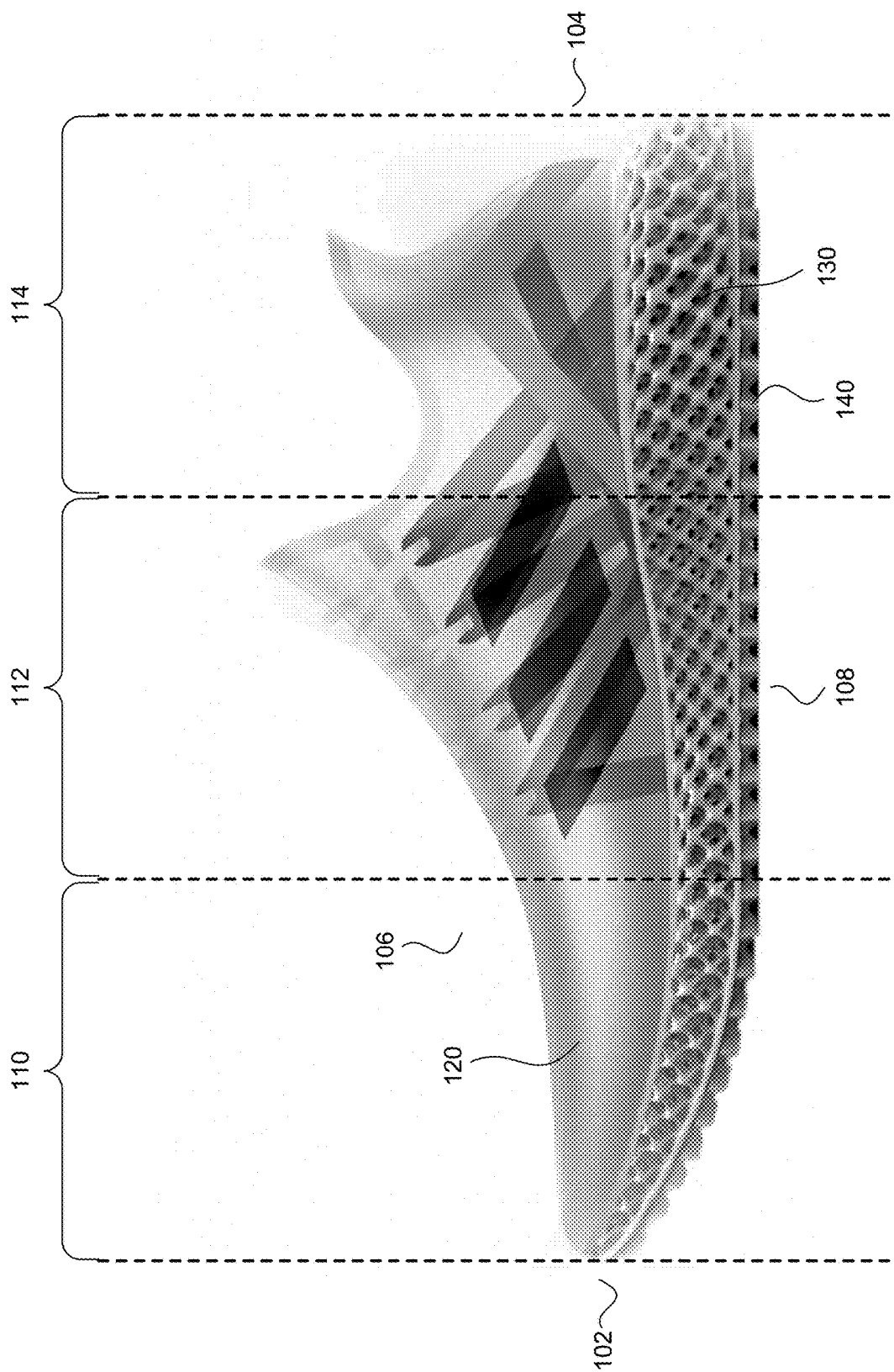
FIG. 2 is a side view of an article of footwear according to some embodiments showing portions of the article of footwear.

FIGS. 1 and 2 show an article of footwear 100 according to some embodiments. Article of footwear 100 can include an upper 120 coupled to a midsole 130. Article of footwear 100 includes a forefoot end 102, a heel end 104, a medial side 106, and a lateral side 108 opposite medial side 106. Also, as shown for example in FIG. 2, article of footwear 100 includes a forefoot portion 110, a midfoot portion 112, and a heel portion 114. Portions 110, 112, and 114 are not intended to demarcate precise areas of article of footwear 100. Rather, portions 110, 112, and 114 are intended to represent general areas of article of footwear 100 that provide a frame of reference. Although portions 110, 112, and 114 apply generally to article of footwear 100, references to portions 110, 112, and 114 also may apply specifically to upper 120 or midsole 130, or individual components of upper 120 or midsole 130.

In some embodiments, article of footwear 100 can include an outsole 140 coupled to midsole 130. Together, midsole 130 and outsole 140 can define a sole 150 of article of footwear 100. In some embodiments, outsole 140 can be directly manufactured (e.g., 3-D printed) on the bottom side of midsole 130. In some embodiments, outsole 140 and midsole 130 can be manufactured in one manufacturing process (e.g., one 3-D printing process) and no bonding, e.g.

via adhesives, may be necessary. In some embodiments, outsole 140 can include a plurality of protrusions 142 to provide traction for article of footwear 100. Protrusions 142 can be referred to as tread.

As shown for example in FIG. 1, midsole 130 can include a three-dimensional mesh 132 composed of a plurality of interconnected unit cells 134. Midsole 130 can be any of the midsoles described herein, for example, midsole 300, midsole 600, and midsole 1500. Also, midsole 130 can include any of the three-dimensional meshes discussed herein.

Upper 120 and sole 150 can be configured for a specific type of footwear, including, but not limited to, a running shoe, a hiking shoe, a water shoe, a training shoe, a fitness shoe, a dancing shoe, a biking shoe, a tennis shoe, a cleat (e.g., a baseball cleat, a soccer cleat, or a football cleat), a basketball shoe, a boot, a walking shoe, a casual shoe, or a dress shoe. Moreover, sole 150 can be sized and shaped to provide a desired combination of cushioning, stability, propulsion, and ride characteristics to article of footwear 100. The term "ride" may be used herein in describing a sense of smoothness or flow occurring during a gait cycle including heel strike, midfoot stance, toe off, and the transitions between these stages. In some embodiments, sole 150 can provide particular ride features including, but not limited to, appropriate control of pronation and supination, support of natural movement, support of unconstrained or less constrained movement, appropriate management of rates of change and transition, and combinations thereof.

Sole 150 and portions thereof (e.g., midsole 130 and outsole 140) can comprise material(s) for providing desired cushioning, ride, propulsion, support, and stability. Suitable materials for sole 150 (e.g., midsole 130 and/or outsole 140) include, but are not limited to, a foam, a rubber, ethyl vinyl acetate (EVA), thermoplastic polyurethane (TPU), expanded thermoplastic polyurethane (eTPU), polyether block amide (PEBA), expanded polyether block amide (ePEBA), thermoplastic rubber (TPR), and a thermoplastic polyurethane (PU). In some embodiments, the foam can comprise, for example, an EVA based foam or a PU based foam and the foam may be an open-cell foam or a closed-cell foam. In some embodiments, midsole 130 and/or outsole 140 can comprise elastomers, thermoplastic elastomers (TPE), foam-like plastics, gel-like plastics, and combinations thereof. In some embodiments, midsole 130 and/or outsole 140 can comprise polyolefins, for example polyethylene (PE), polystyrene (PS) and/or polypropylene (PP). In some embodiments, sole 150 can include a shank or torsion bar. In such embodiments, the shank or torsion bar may be made of a Nylon polymer.

Sole 150 and portions thereof (e.g., midsole 130 and outsole 140) can be formed using an additive manufacturing process, including, but not limited to, selective laser sintering, selective laser melting, selective heat sintering, stereo lithography, fused deposition modeling etc., or 3-D printing in general. In some embodiments, midsole 130 and/or outsole 140 can be formed using an additive manufacturing process including a continuous liquid interface production process. For example, midsole 130 and/or outsole 140 can be formed using a continuous liquid interface production process as described in U.S. Pat. No. 9,453,142, issued on Sep. 27, 2016, which is hereby incorporated in its entirety by reference thereto. In some embodiments, midsole 130 and outsole 140 can be formed as a single piece via an additive manufacturing process. In such embodiments, midsole 130 and outsole 140 can be a single integrally formed piece.

In some embodiments, outsole 140 can be formed by injection molding, blow molding, compression molding, rotational molding, or dipping. In such embodiments, midsole 130 and outsole 140 can be discrete components that are formed separately and attached. In some embodiments, midsole 130 can be attached to outsole 140 via, for example, but not limited to, adhesive bonding, stitching, welding, or a combination thereof. In some embodiments, midsole 130 can be attached to outsole 140 via an adhesive disposed between midsole 130 and outsole 140. Similarly, midsole 130 can be attached to upper 120 via, for example, but not limited to, adhesive bonding, stitching, welding, or a combination thereof.

Figure 3:
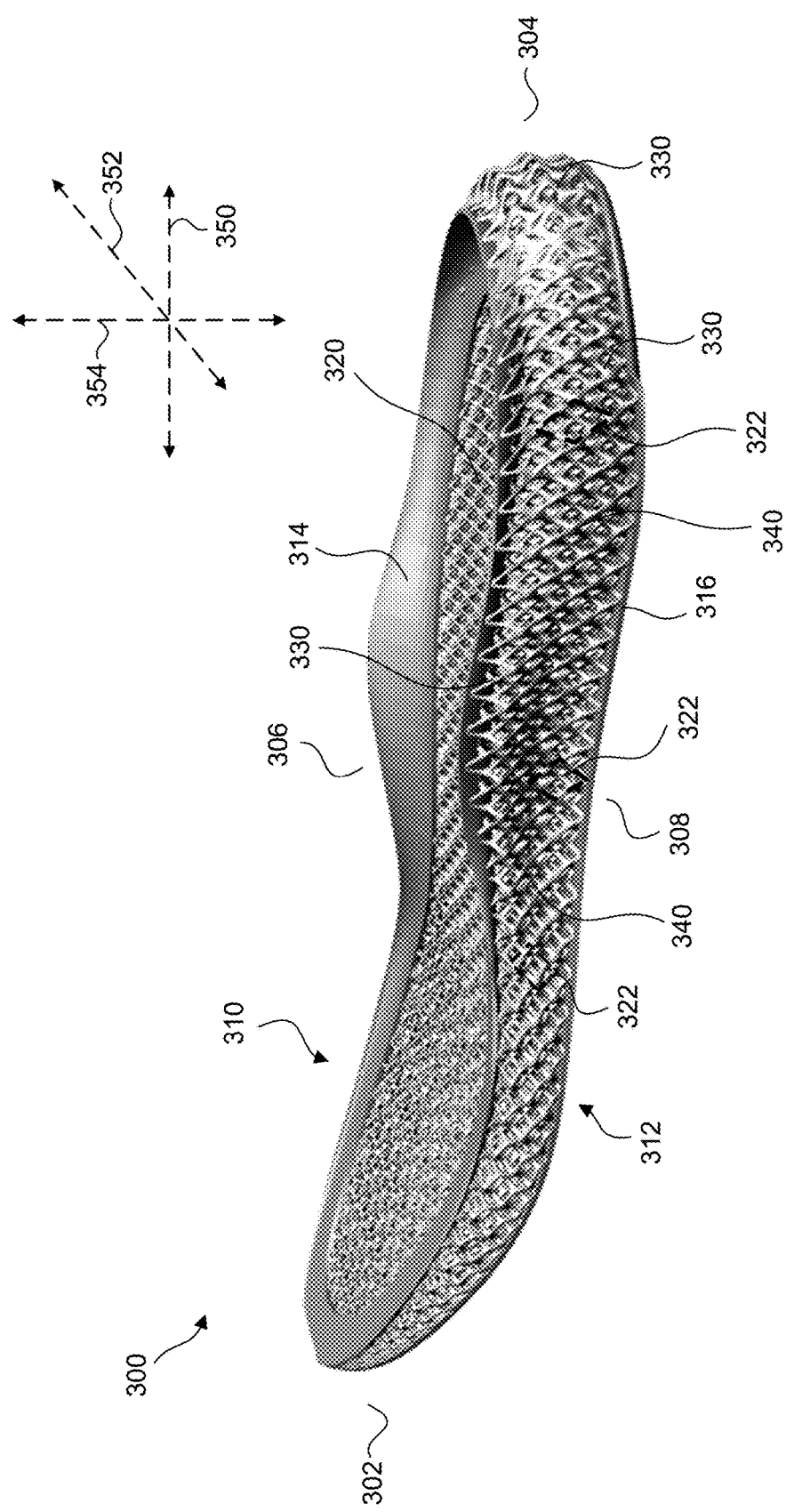
FIG. 3 is a perspective view of a midsole according to some embodiments.

FIG. 3 shows a midsole 300 according to some embodiments. Midsole 300 includes a forefoot end 302, a heel end 304, a medial side 306, a lateral side 308, a top side 310, and a bottom side 312. A longitudinal direction 350 of midsole 300 extends between forefoot end 302 and heel end 304. Longitudinal direction 350 includes a forward longitudinal direction ("forward direction") extending from heel end 304 to forefoot end 302 and a rearward longitudinal direction ("rearward direction") extending from forefoot end 302 to heel end 304. A transverse direction 352 of midsole 300 extends between medial side 306 and lateral side 308 of midsole 300. Transverse direction 352 includes a medial transverse direction ("medial direction") extending from lateral side 308 to medial side 306 and a lateral transverse direction ("lateral direction") extending from medial side 306 to lateral side 308. A vertical direction 354 of midsole 300 extends between top side 310 and bottom side 312 of midsole 300. Vertical direction 354 includes an upward vertical direction ("upward direction") extending from bottom side 312 to top side 310 and a downward vertical direction ("downward direction") extending from top side 310 to bottom side 312. Top side 310 can be considered an "upper-facing side" and bottom side 312 can be considered a "ground-facing side."

Midsole 300 can be defined, in whole or in part, by a three-dimensional mesh 320. For example, in some embodiments, three-dimensional mesh 320 can define one or more of a forefoot portion 110 of midsole 300, a midfoot portion 112 of midsole 300, and/or a heel portion 114 of midsole. In some embodiments, three-dimensional mesh 320 can define all or a portion of forefoot portion 110 of midsole 300. In some embodiments, three-dimensional mesh 320 can define all or a portion of midfoot portion 112 of midsole 300. In some embodiments, three-dimensional mesh 320 can define all or a portion of heel portion 114 of midsole 300.

Similar to midsole 300, three-dimensional mesh 320 can be described as having a forefoot end 302, a heel end 304, a medial side 306, a lateral side 308, a top side 310, and a bottom side 312. Unless specified otherwise, a forefoot end 302, heel end 304, medial side 306, lateral side 308, top side 310, and bottom side 312 for a three-dimensional mesh 320 does not necessarily correspond to a forefoot end 302, heel end 304, medial side 306, lateral side 308, top side 310, or bottom side 312 of midsole 300. A forefoot end 302 of three-dimensional mesh 320 refers to a foremost end of three-dimensional mesh 320 and a heel end 304 of three-dimensional mesh 320 refers to a rearmost end of three-dimensional mesh 320. A medial side 306 of three-dimensional mesh 320 refers to a medial-most side of three-dimensional mesh 320 and a lateral side 308 of three-dimensional mesh 320 refers to a lateral-most side of three-dimensional mesh 320. A top side 310 of three-dimensional mesh 320 refers to a topmost side of three-dimensional mesh 320 and a bottom side 312 of three-dimensional mesh 320 refers to a bottommost side of three-dimensional mesh 320.

In some embodiments, midsole 300 can include a rim 314 disposed around all or a portion of the perimeter of top side 310 of midsole 300. In some embodiments, rim 314 can be disposed around all or a portion of the perimeter of medial and lateral sides 306/308 of midsole 300. In embodiments including rim 314, rim 314 can provide stability for the perimeter of midsole 300 and/or can facilitate attachment of midsole 300 to an upper (e.g., upper 120). In some embodiments, an outsole 316 can be coupled to bottom side 312 of midsole 300.

Three-dimensional mesh 320 includes a plurality of interconnected unit cells 322. The interconnected unit cells 322 include a plurality of struts 330 defining a three-dimensional shape of a respective unit cell 322. A plurality of struts 330 of three-dimensional mesh 320 are connected at nodes 340. The number of struts 330 that are connected at a node 340 is the "valence number" of the node 340. For example, if four struts 330 are connected at a node 340, that node 340 has a valence of four. In some embodiments, nodes 340 can have a valence number in the range of two to twelve. For example, a node 340 can have a valence number of two, three, four, five, six, seven, eight, nine, ten, eleven, or twelve, or within a range having any two of these values as endpoints.

Interconnected unit cells 322 can be organized in a lattice framework that defines a volume of three-dimensional mesh 320. A lattice framework is composed of a plurality of lattice cells in which unit cells 322 are populated and arranged. A lattice framework is an invisible framework used to arrange unit cells 322, or partial unit cells (i.e., sub-cells), and construct a three-dimensional mesh 320 as described herein. In some embodiments, the lattice framework can be an unwarped lattice framework, for example a purely cubic lattice framework. In some embodiments, the lattice framework can be a warped lattice framework, for example a warped cubic lattice framework. A warped lattice framework can include warped lattice cells and unwarped lattice cells. Other exemplary lattice frameworks include, but are not limited to, a tetrahedron lattice framework, a warped tetrahedron lattice framework, a dodecahedron lattice framework, or a warped dodecahedron lattice framework.

Figure 14B:
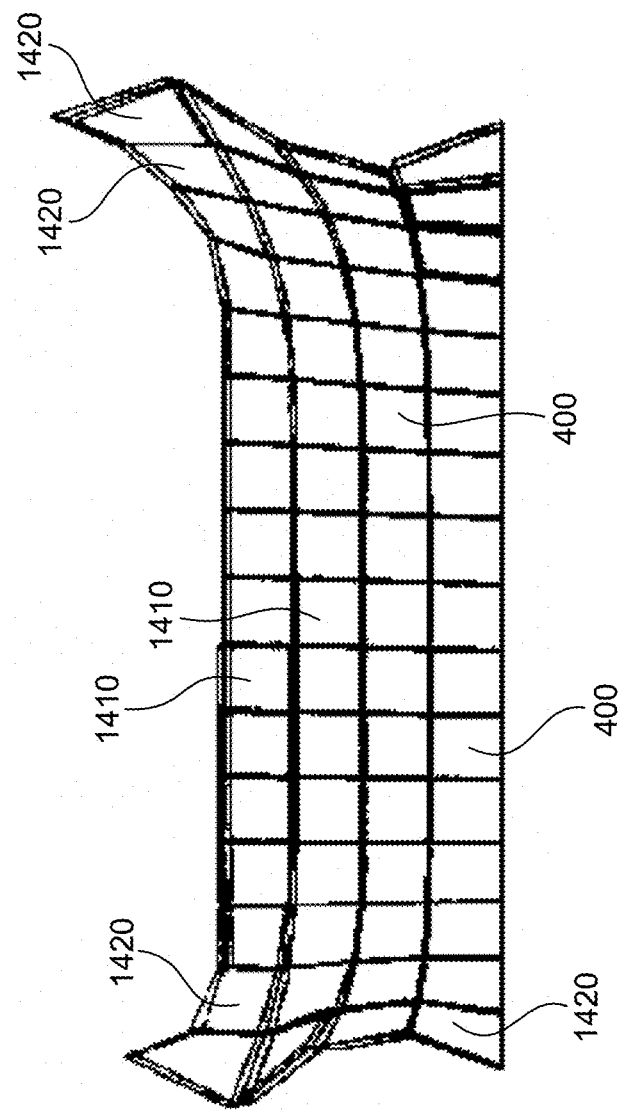
FIG. 14B is a cross-sectional segment taken from FIG. 14A.

A lattice framework can be generated using a computer modeling program such, as but not limited to, Grasshopper 3D and/or Rhinoceros 3D CAD software. FIGS. 14A and 14B show an exemplary warped cubic lattice framework 1400 including a plurality of lattice cells 400, including both unwrapped lattice cells 1410 and warped lattice cells 1420. In some embodiments, a lattice framework can be created and/or populated in the same or a similar manner as described in U.S. Pat. No. 10,575,588, published Mar. 3, 2020, which is hereby incorporated by reference in its entirety.

Three-dimensional mesh 320 can include one or more mechanically anisotropic regions. A three-dimensional mesh 320 with one or more mechanically anisotropic regions can define all or a portion of a forefoot portion 110 of midsole 300, a midfoot portion 112 of midsole 300, and/or a heel portion 114 of midsole. In some embodiments, a mechanically anisotropic region can define all or a portion of forefoot portion 110 of midsole 300. In some embodiments, a mechanically anisotropic region can define all or a portion of midfoot portion 112 of midsole 300. In some embodiments, a mechanically anisotropic region can define all or a portion of heel portion 114 of midsole 300. In some embodiments, three-dimensional mesh 320 can include at least two mechanically anisotropic regions.

A mechanically anisotropic region of three-dimensional mesh 320 can have a first lattice shear modulus measured in a first direction and a second lattice shear modulus different from the first lattice shear modulus and measured in a second direction opposite to the first direction. In some embodiments, a mechanically anisotropic region of three-dimensional mesh 320 can have a third lattice shear modulus measured in a third direction and a fourth lattice shear modulus different from the third lattice shear modulus and measured in a fourth direction opposite to the third direction.

As used herein, unless specified otherwise, references to "first," "second," "third," "fourth," etc. are not intended to denote order, or that an earlier-numbered feature is required for a later-numbered feature. Also, unless specified otherwise, the use of "first," "second," "third," "fourth," etc. does not necessarily mean that the "first," "second," "third," "fourth," etc. features have different properties or values.

Figure 5B:
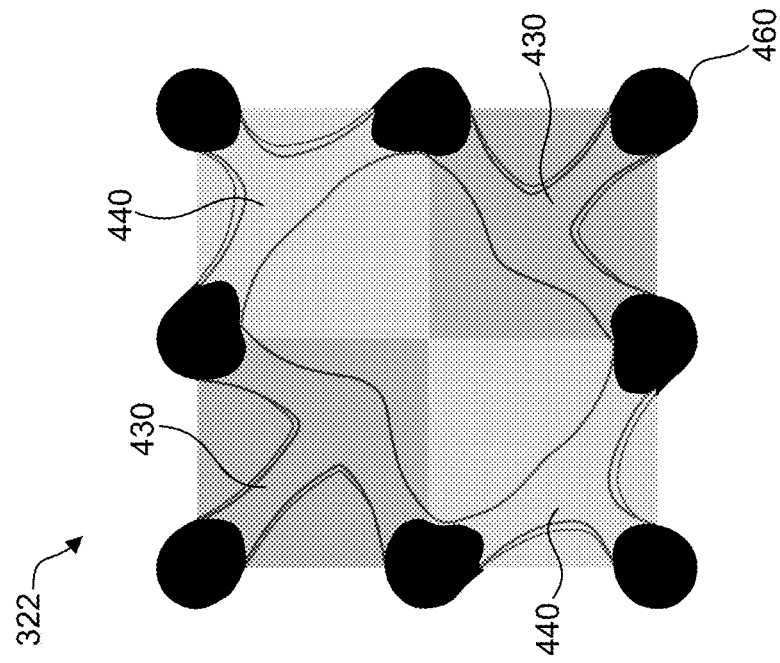
FIG. 5B is a side view of the unit cell shown in FIG. 5A.
Figure 5A:
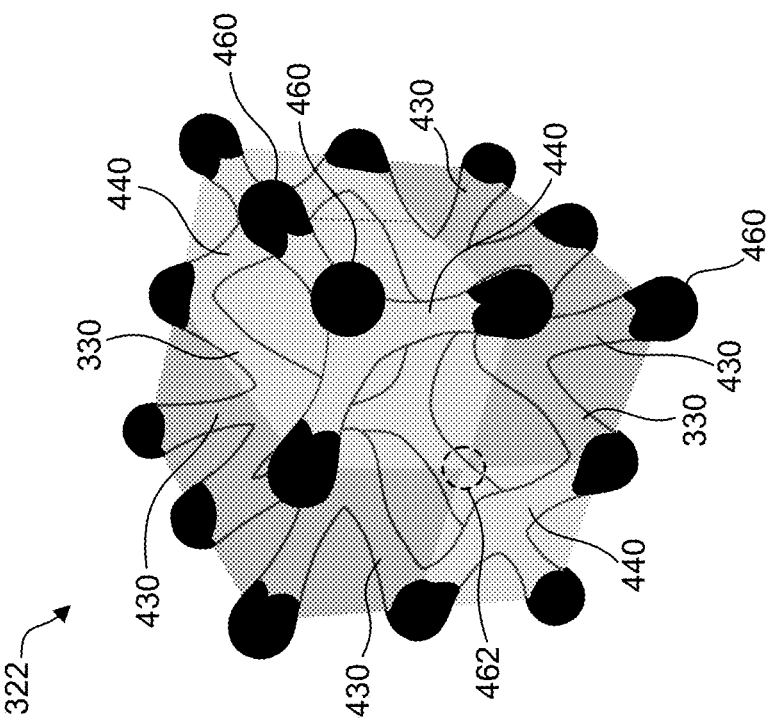
FIG. 5A is a perspective view of a unit cell according to some embodiments.

In some embodiments, a plurality of interconnected unit cells 322 defining three-dimensional mesh 320, or an anisotropic region thereof, can each include a soft sub-cell and a stiff sub-cell. In some embodiments, each of the plurality of interconnected unit cells 322 can each include a plurality of soft sub-cells and a plurality of stiff sub-cells. In some embodiments, each of the plurality of interconnected unit cells 322 can each include a plurality of the same soft sub-cells and a plurality of the same stiff sub-cells. FIGS. 5A and 5B illustrate exemplary soft-sub cells 430 and stiff sub-cells 440 according to some embodiments.

In some embodiments, every interconnected unit cell 322 defining three-dimensional mesh 320, or an anisotropic region thereof, can include a soft sub-cell and a stiff sub-cell. In some embodiments, every interconnected unit cell 322 defining three-dimensional mesh 320, or an anisotropic region thereof, can include a plurality of soft sub-cells and a plurality of stiff sub-cells. In some embodiments, every interconnected unit cell 322 located in portions of three-dimensional mesh 320, or an anisotropic region thereof, having a thickness measured in vertical direction 354 at least a large as the thickness of a unit cell 322 can include a soft sub-cell and a stiff sub-cell. In some embodiments, every interconnected unit cell 322 located in portions of three-dimensional mesh 320, or an anisotropic region thereof, having a thickness measured in vertical direction 354 at least a large as the thickness of a unit cell 322 can include a plurality of soft sub-cells and a plurality of stiff sub-cells.

In some embodiments, a plurality of interconnected unit cells 322 defining three-dimensional mesh 320, or an anisotropic region thereof, can include eight sub-cells. In some embodiments, the eight sub-cells can include a plurality of soft sub-cells and a plurality of stiff sub-cells. In some embodiments, the eight sub-cells can include four soft sub-cells and four stiff sub-cells. In some embodiments, the eight sub-cells can include four of the same soft sub-cells and four of the same stiff sub-cells.

Soft sub-cells are composed of a plurality of struts 330 and one or more nodes 340 that define a portion of unit cell 322. In other words, soft sub-cells are partial unit cells defining a portion of unit cell 322. As used herein, a "soft sub-cell" is a sub-cell for a lattice structure having: (i) a modeled compressive modulus that is less than a modeled compressive modulus of a lattice structure for a "stiff sub-cell" defining a portion of the same unit cell 322, (ii) a modeled shear modulus that is less than a modeled shear modulus of a lattice structure for a "stiff sub-cell" defining a portion of the same unit cell 322, or (iii) both.

Stiff sub-cells are composed of a plurality of struts 330 and one or more nodes 340 that define a portion of unit cell 322. In other words, stiff sub-cells are partial unit cells defining a portion of unit cell 322. As used herein, a "stiff sub-cell" is a sub-cell for a lattice structure having (i) a modeled compressive modulus that is greater than a modeled compressive modulus of a lattice structure for a "soft sub-cell" defining a portion of the same unit cell 322, (ii) a modeled shear modulus that is greater than a modeled shear modulus of a lattice structure for a "soft sub-cell" defining a portion of the same unit cell 322, or (iii) both.

Figure 8B:
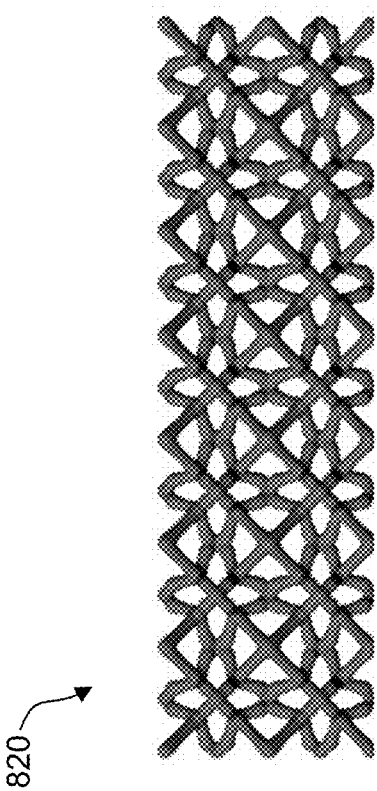
FIGS. 8A-8C show isotropic lattice structures for soft sub-cells according to some embodiments.
Figure 8A:
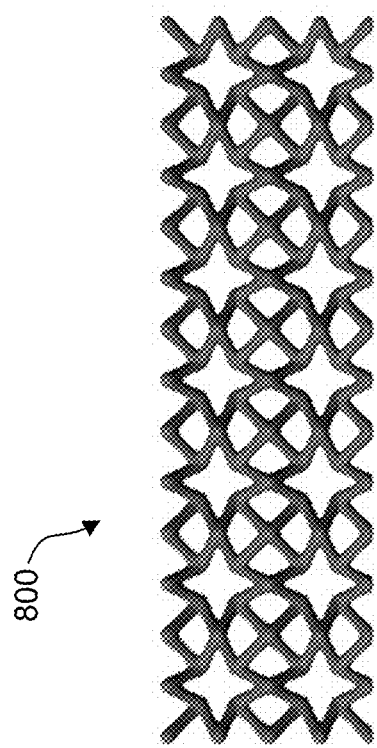
Figure 8C:
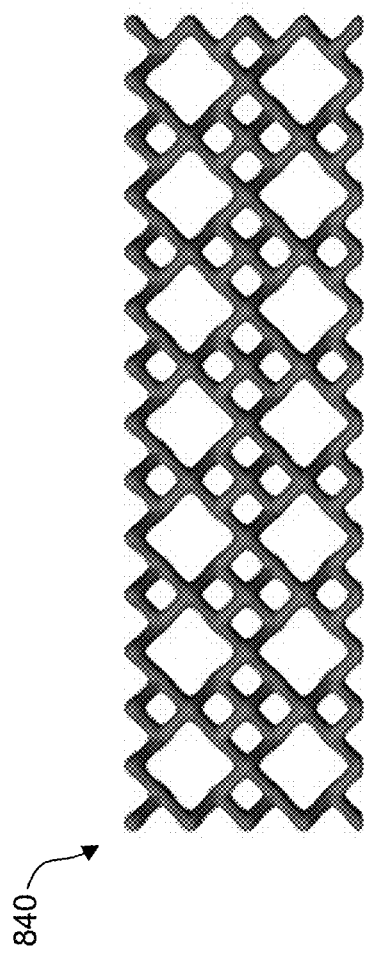

A soft sub-cell for a unit cell 322 can be a sub-cell for a first lattice structure and a stiff sub-cell for the unit cells 322 can be a sub-cell for a second lattice structure different from the first lattice structure. In some embodiments, the first lattice structure can be an isotropic lattice structure. In some embodiments, the second lattice structure can be an isotropic lattice structure. In some embodiments, the first lattice structure and the second lattice structure can be isotropic lattice structures. FIGS. 8A-8C show exemplary isotropic lattice structures for soft-sub cells according to some embodiments. FIGS. 9A-9C show exemplary isotropic lattice structures for stiff-sub cells according to some embodiments.

In some embodiments, the first lattice structure for soft sub-cells can have a first modeled compressive modulus and the second lattice structure for stiff sub-cells can have a second modeled compressive modulus 15% or more greater than the first modeled compressive modulus. In some embodiments, the first lattice structure for soft sub-cells can have a first modeled compressive modulus and the second lattice structure for stiff sub-cells can have a second modeled compressive modulus greater than the first modeled compressive modulus by 15% to 500%, including subranges. For example, the second lattice structure can have a second modeled compressive modulus that is 15% to 500% greater than the first modeled compressive modulus, 15% to 400% greater than the first modeled compressive modulus, 15% to 200% greater than the first modeled compressive modulus, 15% to 100% greater than the first modeled compressive modulus, 100% to 500% greater than the first modeled compressive modulus, or 200% to 500% greater than the first modeled compressive modulus, or within a range having any two of these values as endpoints.

In some embodiments, the first lattice structure for soft sub-cells can have a first modeled shear modulus and the second lattice structure for stiff sub-cells can have a second modeled shear modulus 15% or more greater than the first modeled shear modulus. In some embodiments, the first lattice structure for soft sub-cells can have a first modeled shear modulus and the second lattice structure for stiff sub-cells can have a second modeled shear modulus greater than the first modeled shear modulus by 15% to 500%, including subranges. For example, the second lattice structure can have a second modeled shear modulus that is 15% to 500% greater than the first modeled shear modulus, 15% to 400% greater than the first modeled shear modulus, 15% to 200% greater than the first modeled shear modulus, 15% to 100% greater than the first modeled shear modulus, 100% to 500% greater than the first modeled shear modulus, or 200% to 500% greater than the first modeled shear modulus, or within a range having any two of these values as endpoints.

As used herein, a "modeled compressive modulus" and a "modeled shear modulus" for a lattice structure are determined using the following model. A beam model simulation of a unit cell puck is modeled using FEA modeling software. Suitable FEA modeling software includes Abaqus FEA modeling software. For model efficiency purposes, a unit cell puck as small as a 3×3×1 unit cell puck can be used. A 3×3×1 unit cell puck includes one layer of 3 longitudinal rows of 3 unit cells arranged and adjacent to each other in the transverse direction as described herein. Other unit cell puck sizes can be used as long as the same size is used when comparing a modeled compressive modulus or a modeled shear modulus for two or more lattice structures. The unit cell puck is modeled as being sandwiched between and in contact with a top plate and a bottom plate. The following parameters were input into the FEA modeling software for the simulation: (1) material characteristics of the modeled struts for the unit cell puck (including density and elastic material properties), (2) the loading conditions, and (3) the contact mechanics between the unit cell puck and the two plates (including the frictional properties).

To determine a "modeled compressive modulus," a uniaxial compression load is applied by compressing the puck up to 50% strain using the top plate and capturing the resulting stress-strain curve. The modeled compressive modulus is calculated by measuring the slope of the stress-strain curve in the elastic deformation region.

To determine a "modeled shear modulus" the top plate is compressed with a 45-degree angle from the horizontal plane and the resulting stress-strain curve is captured. The modeled shear modulus is calculated by measuring the slope of the stress-strain curve in the elastic deformation region.

Figure 4B:
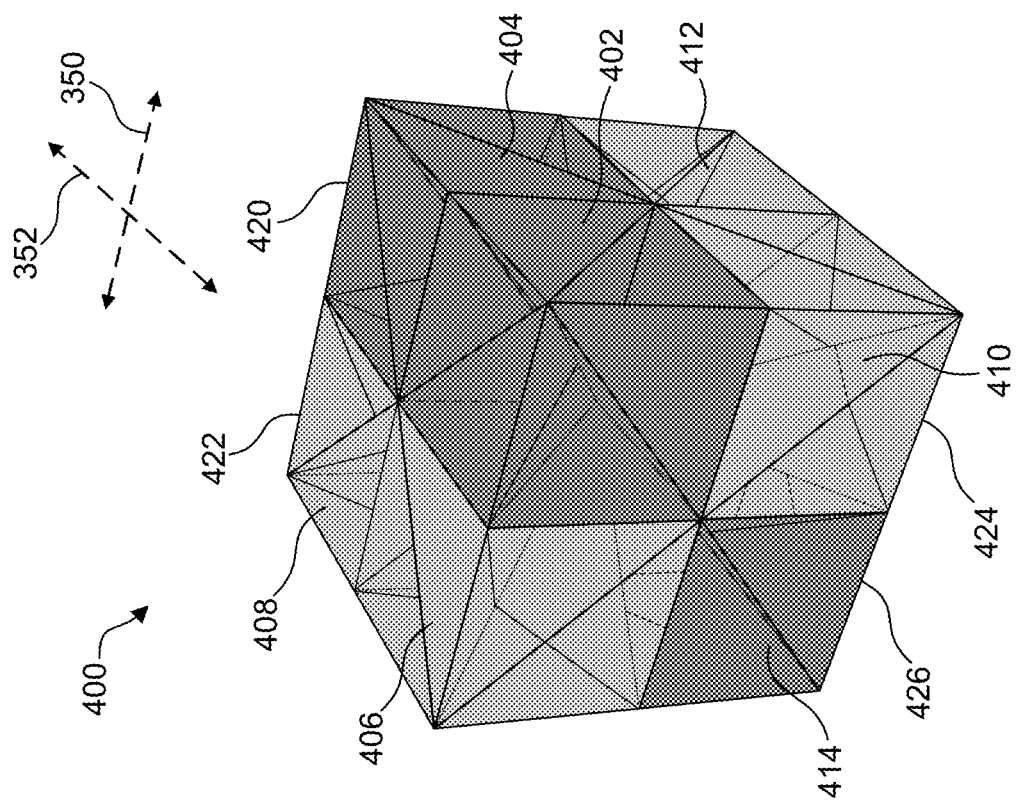
FIG. 4B is a second perspective of the lattice cell shown in FIG. 4A.
Figure 4A:
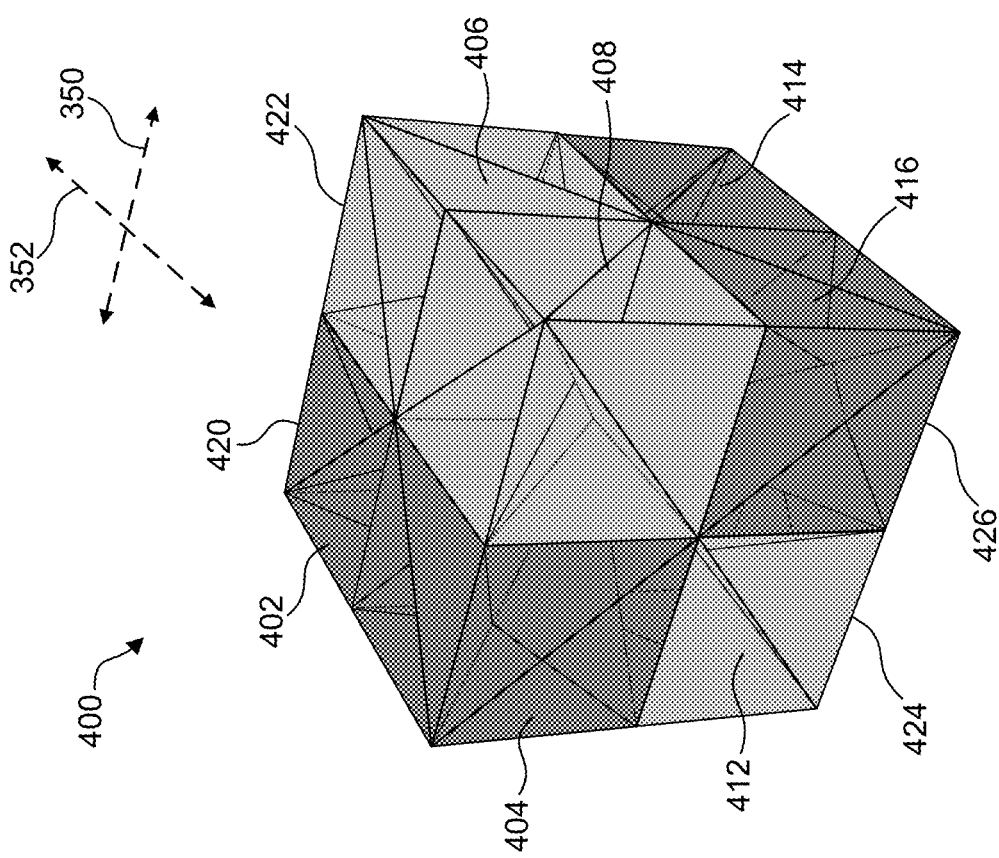
FIG. 4A is a first perspective view of a lattice cell according to some embodiments.

By arranging soft sub-cells and stiff-sub cells at different locations in unit cells 322, the mechanical properties of the unit cell 322, and therefore three-dimensional mesh 320, can be controlled. As discussed above, unit cells 322 for a three-dimensional mesh 320 can be populated and arranged in lattice cells for a lattice framework defining the volume of a three-dimensional mesh 320. The location of soft sub-cells and stiff sub-cells in unit cells 322 can be defined by the location of the soft sub-cells and the stiff sub-cells in a lattice cell 400 in which a unit cell 322 is populated. FIGS. 4A and 4B show a lattice cell 400 according to some embodiments. FIGS. 5A and 5B show a unit cell 322 composed of soft sub-cells 430 and stiff sub-cells 440 located in lattice cell 400 according to some embodiments.

In some embodiments, the location of soft-cells and stiff sub-cells in a lattice cell 400 can be defined by the location of one or more soft sub-cells and one or more stiff sub-cells in two or more of the following quadrants of lattice cell 400: (i) an upper-forward quadrant 420, (ii) an upper-rearward quadrant 422, (iii) a lower-forward quadrant 424, and (iv) a lower-rearward quadrant 426. Upper-forward quadrant 420 and upper-rearward quadrant 422 are the two upper-most quadrants of lattice cell 400 in upward vertical direction 354. Upper-forward quadrant 420 and upper-rearward quadrant 422 are located above lower-forward quadrant 424 and lower-rearward quadrant 426, respectively. Upper-forward quadrant 420 and lower-forward quadrant 424 are the two forward-most quadrants of lattice cell 400 in forward longitudinal direction 350. Upper-forward quadrant 420 and lower-forward quadrant 424 are located forward of upper-rearward quadrant 422 and lower-rearward quadrant 426, respectively. A unit cell 322 populated in a lattice cell 400 can also be described as having an upper-forward quadrant 420, an upper-rearward quadrant 422, a lower-forward quadrant 424, and a lower-rearward quadrant 426.

In some embodiments, unit cells 322 of three-dimensional mesh 320 can include one or more soft sub-cells located in upper-forward quadrant 420. In some embodiments, unit cells 322 of three-dimensional mesh 320 can include two soft sub-cells located in upper-forward quadrant 420.

In some embodiments, unit cells 322 of three-dimensional mesh 320 can include one or more stiff sub-cells located in upper-forward quadrant 420. In some embodiments, unit cells 322 of three-dimensional mesh 320 can include two stiff sub-cells located in upper-forward quadrant 420.

In some embodiments, unit cells 322 of three-dimensional mesh 320 can include one or more soft sub-cells located in upper-rearward quadrant 422. In some embodiments, unit cells 322 of three-dimensional mesh 320 can include two soft sub-cells located in upper-rearward quadrant 422.

In some embodiments, unit cells 322 of three-dimensional mesh 320 can include one or more stiff sub-cells located in upper-rearward quadrant 422. In some embodiments, unit cells 322 of three-dimensional mesh 320 can include two stiff sub-cells located in upper-rearward quadrant 422.

In some embodiments, unit cells 322 of three-dimensional mesh 320 can include one or more soft sub-cells located in lower-forward quadrant 424. In some embodiments, unit cells 322 of three-dimensional mesh 320 can include two soft sub-cells located in lower-forward quadrant 424.

In some embodiments, unit cells 322 of three-dimensional mesh 320 can include one or more stiff sub-cells located in lower-forward quadrant 424. In some embodiments, unit cells 322 of three-dimensional mesh 320 can include two stiff sub-cells located in lower-forward quadrant 424.

In some embodiments, unit cells 322 of three-dimensional mesh 320 can include one or more soft sub-cells located in lower-rearward quadrant 426. In some embodiments, unit cells 322 of three-dimensional mesh 320 can include two soft sub-cells located in lower-rearward quadrant 426.

In some embodiments, unit cells 322 of three-dimensional mesh 320 can include one or more stiff sub-cells located in lower-rearward quadrant 426. In some embodiments, unit cells 322 of three-dimensional mesh 320 can include two stiff sub-cells located in lower-rearward quadrant 426.

In some embodiments, unit cells 322 of three-dimensional mesh 320 can include the following sub-cells: (i) at least one soft sub-cell located in the upper-forward quadrant 420, (ii) at least one stiff sub-cell located in the upper-rearward quadrant 422, (iii) at least one stiff sub-cell located in the lower-forward quadrant 424, and (iv) at least one soft sub-cell located in the lower-rearward quadrant 426. In such embodiments, this arrangement of soft and stiff sub-cells can result in a three-dimensional mesh 320 capable of converting vertical loading energy into forward displacement, which can propel a wearer's foot forward when a sole including the three-dimensional mesh 320 contacts the ground during use. In other words, this arrangement of soft and stiff sub-cells can result in a three-dimensional mesh 320 predisposed to deform forwards (i.e., in forward longitudinal direction 350) when a sole including the three-dimensional mesh 320 contacts the ground.

The opposite result can be achieved by rotating the orientation of the unit cells 322 by 180°. In such embodiments, unit cells 322 of three-dimensional mesh 320 can include the following sub-cells: (i) at least one stiff sub-cell located in the upper-forward quadrant 420, (ii) at least one soft sub-cell located in the upper-rearward quadrant 422, (iii) at least one soft sub-cell located in the lower-forward quadrant 424, and (iv) at least one stiff sub-cell located in the lower-rearward quadrant 426. In such embodiments, this arrangement of soft and stiff sub-cells can result in a three-dimensional mesh 320 that is predisposed to deform rearwards (i.e., in rearward longitudinal direction 350) when a sole including the three-dimensional mesh 320 contacts the ground.

FIGS. 5A and 5B show a lattice cell 400 populated with soft sub-cells 430 and stiff sub-cells 440 for a unit cell 322 according to some embodiments. The unit cell 322 shown includes: (i) two soft sub-cells 430 located side-by-side in the upper-forward quadrant 420, (ii) two stiff sub-cells 440 located side-by-side in the upper-rearward quadrant 422, (iii) two stiff sub-cells 440 located in the lower-forward quadrant 424, and (iv) two soft sub-cells 430 located in the lower-rearward quadrant 426. This arrangement of soft and stiff sub-cells can result in a three-dimensional mesh 320 that is predisposed to deform forwards (i.e., in forward longitudinal direction 350) when a sole including the three-dimensional mesh 320 contacts the ground.

In some embodiments, the location of soft sub-cells and stiff sub-cells in a lattice cell 400 can be defined by the location of a soft sub-cell or a stiff sub-cell in two or more of the following eight zones of lattice cell 400: (i) an upper-forward-medial zone 402, (ii) an upper-forward-lateral zone 404, (iii) an upper-rearward-medial zone 406, (iv) an upper-rearward-lateral zone 408, (v) a lower-forward-medial zone 410, (vi) a lower-forward-lateral zone 412, (vii) a lower-rearward-medial zone 414, and (viii) a lower-rearward-lateral zone 416. Upper-forward-medial zone 402 and upper-forward-lateral zone 404 are located in upper-forward quadrant 420 of lattice cell 400, with zone 402 located medially to zone 404 in transverse direction 352. Upper-rearward-medial zone 406 and upper-rearward-lateral zone 408 are located in upper-rearward quadrant 422 of lattice cell 400, with zone 406 located medially to zone 408 in transverse direction 352. Lower-forward-medial zone 410 and lower-forward-lateral zone 412 are located in lower-forward quadrant 424 of lattice cell 400, with zone 410 located medially to zone 412 in transverse direction 352. Lower-rearward-medial zone 414 and lower-rearward-lateral zone 416 are located in lower-rearward quadrant of lattice cell 400, with zone 414 located medially to zone 416 in transverse direction 352.

A sub-cell located in upper-forward-medial zone 402 can be referred to as an upper-forward-medial sub-cell. In some embodiments, an upper-forward-medial sub-cell can be a soft sub-cell. In some embodiments, an upper-forward-medial sub-cell can be a stiff sub-cell.

A sub-cell located in upper-forward-lateral zone 404 can be referred to as an upper-forward-lateral sub-cell. In some embodiments, an upper-forward-lateral sub-cell can be a soft sub-cell. In some embodiments, an upper-forward-lateral sub-cell can be a stiff sub-cell.

A sub-cell located in upper-rearward-medial zone 406 can be referred to as an upper-rearward-medial sub-cell. In some embodiments, an upper-rearward-medial sub-cell can be a soft sub-cell. In some embodiments, an upper-rearward-medial sub-cell can be a stiff sub-cell.

A sub-cell located in upper-rearward-lateral zone 408 can be referred to as an upper-rearward-lateral sub-cell. In some embodiments, an upper-rearward-lateral sub-cell can be a soft sub-cell. In some embodiments, an upper-rearward-lateral sub-cell can be a stiff sub-cell.

A sub-cell located in lower-forward-medial zone 410 can be referred to as a lower-forward-medial sub-cell. In some embodiments, a lower-forward-medial sub-cell can be a soft sub-cell. In some embodiments, a lower-forward-medial sub-cell can be a stiff sub-cell.

A sub-cell located in lower-forward-lateral zone 412 can be referred to as a lower-forward-lateral sub-cell. In some embodiments, a lower-forward-lateral sub-cell can be a soft sub-cell. In some embodiments, a lower-forward-lateral sub-cell can be a stiff sub-cell.

A sub-cell located in lower-rearward-medial zone 414 can be referred to as a lower-rearward-medial sub-cell. In some embodiments, a lower-rearward-medial sub-cell can be a soft sub-cell. In some embodiments, a lower-rearward-medial sub-cell can be a stiff sub-cell.

A sub-cell located in lower-rearward-lateral zone 416 can be referred to as a lower-rearward-lateral sub-cell. In some embodiments, a lower-rearward lateral sub-cell can be a soft sub-cell. In some embodiments, a lower-rearward lateral sub-cell can be a stiff sub-cell.

FIGS. 5A and 5B show lattice cell 400 populated with four soft sub-cells 430 and four stiff sub-cells 440 for a unit cell 322 according to some embodiments. The unit cell 322 shown includes: (i) an upper-forward-medial soft sub-cell 430 located in upper-forward-medial zone 402, (ii) an upper-forward-lateral soft sub-cell 430 located in upper-forward-lateral zone 404, (iii) an upper-rearward-medial stiff sub-cell 440 located in upper-rearward-medial zone 406, (iv) an upper-rearward-lateral stiff sub-cell 440 located in upper-rearward-lateral zone 408, (v) a lower-forward-medial stiff sub-cell 440 located in lower-forward-medial zone 410, (vi) a lower-forward-lateral stiff sub-cell 440 located in lower-forward-lateral zone 412, (vii) a lower-rearward-medial soft sub-cell 430 located in lower-rearward-medial zone 414, and (viii) a lower-rearward-lateral soft-sub cell 430 located in lower-rearward-lateral zone 416.

Sub-cells populated in lattice cell 400 can include struts 330 connected at a plurality of edge nodes 460 located at edges of lattice cell 400. In some embodiments, sub-cells populated lattice cell 400 can include struts 330 connected at a plurality of face nodes 462 located on faces of lattice cell 400. For structural integrity of mesh 320, it is preferred to populate lattice cells 400 with soft and stiff sub-cells that share the same edge nodes 460, and in embodiments including face nodes 462, that share the same face nodes 462. If soft and stiff sub-cells that do not share the same edge nodes 460 and/or face nodes 462 are populated into lattice cell 400, it can result in a unit cell with one or more struts 330 not connected to another strut 330 within mesh 320.

By arranging soft and stiff sub-cells in any of the various combinations discussed above, mechanical properties of three-dimensional mesh 320, or an anisotropic region thereof, can be manipulated and leveraged to create desired performance characteristics for three-dimensional mesh 320. Exemplary mechanical properties that be manipulated and leveraged include, but are not limited to, lattice shear moduli in different directions and lattice compressive modulus. The position of soft and stiff sub-cells in the different zones and quadrants of lattice cell 400 can influence the mechanical properties of unit cells 322, and therefore three-dimensional mesh 320, in different directions. In some embodiments, soft and stiff sub-cells can be positioned to create unit cells 322 that result in a three-dimensional mesh 320 with different lattice shear moduli in forward and rearward directions. In some embodiments, soft and stiff sub-cells can be positioned to create unit cells 322 that result in a three-dimensional mesh 320 with different lattice shear moduli in a medial and lateral directions.

Figure 6A:
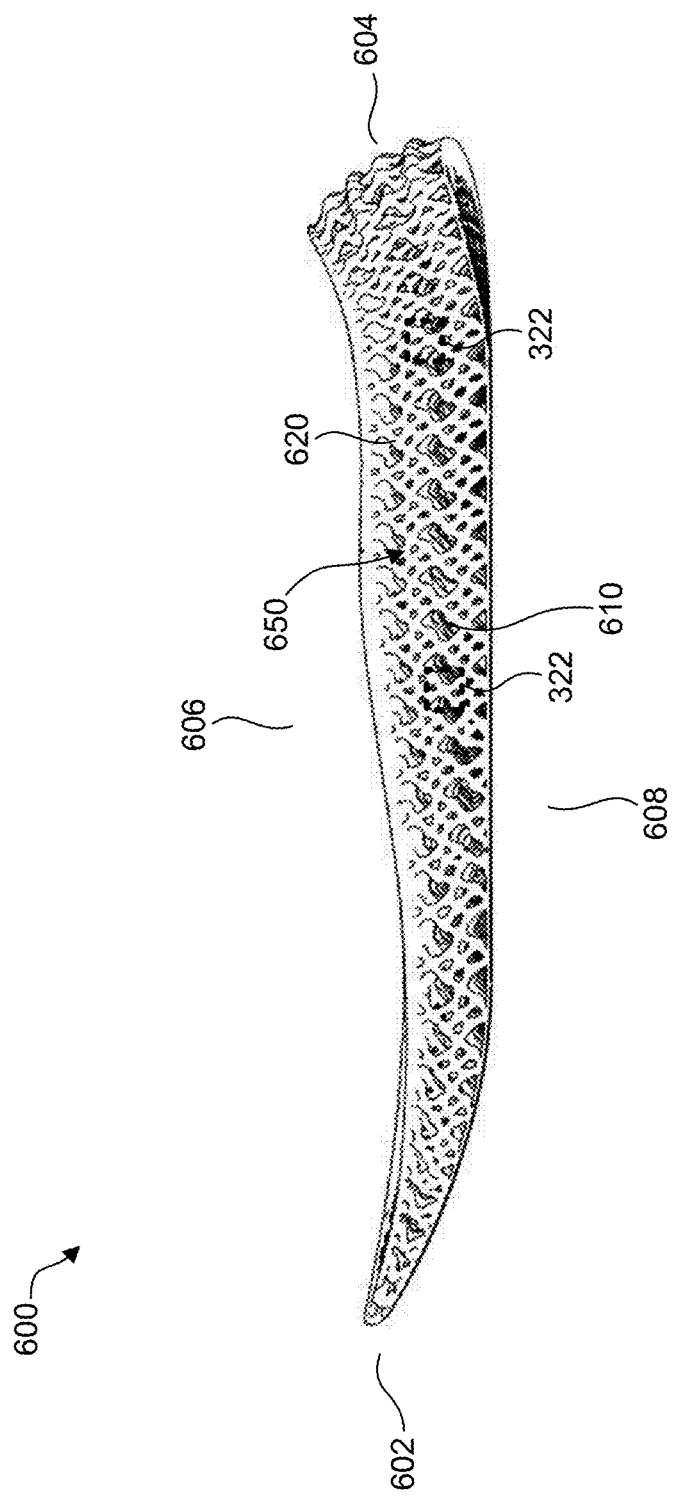
FIG. 6A is a side view of a midsole according to some embodiments.
Figure 6B:
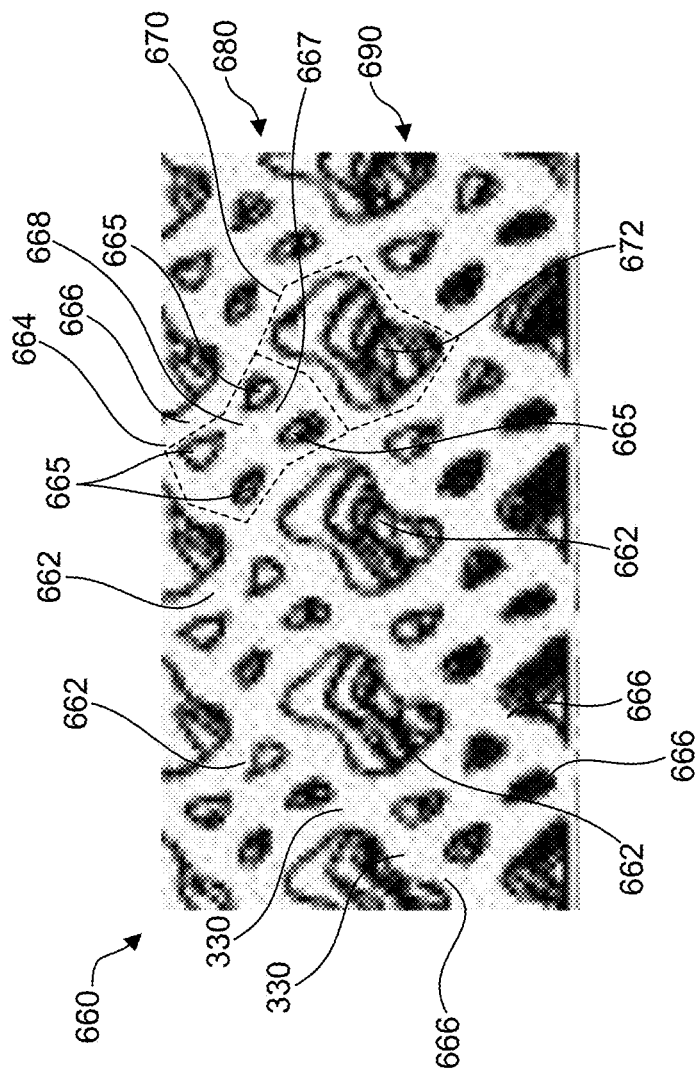
FIG. 6B is a zoomed-in view of a portion of FIG. 6A.

FIGS. 6A and 6B illustrate a midsole 600 with a three-dimensional mesh 620 having a mechanically anisotropic region 650 according to some embodiments. Midsole 600 includes a forefoot end 602, a heel end 604, a medial side 606, and a lateral side 608. Mechanically anisotropic region 650 of midsole 600 includes a plurality of unit cells 322 composed of soft sub-cells 430 and stiff sub-cells 440 arranged in lattice cells 400 as shown in FIGS. 5A and 5B. Anisotropic region 650 extends from forefoot portion 110 of midsole 600, through midfoot portion 112 of midsole 600, and to heel portion 114 of midsole 600. Anisotropic region 650 of three-dimensional mesh 320 includes the anisotropic lattice structure 700 shown in FIG. 7A. Mechanically anisotropic region 650 can be predisposed to deform forward under a vertical load as described herein.

In some embodiments, three-dimensional mesh 320, or an anisotropic region thereof (for example anisotropic region 650), can include a lattice shear modulus measured in a forward direction (i.e., forward longitudinal direction 350) and a lattice shear modulus measured in a rearward direction (i.e., rearward longitudinal direction 350) different than the lattice shear modulus measured in the forward direction. In some embodiments, the lattice shear modulus measured in the rearward direction can be different from the lattice shear modulus measured in the forward direction by 10% or more. In some embodiments, the lattice shear modulus measured in the rearward direction can be different from the lattice shear modulus measured in the forward direction by 10% to 400%, including subranges. For example, the lattice shear modulus measured in the rearward direction can be different from the lattice shear modulus measured in the forward direction by 10% to 400%, 50% to 400%, 100% to 400%, or 200% to 400%, or within a range having any two of these values as endpoints.

In some embodiments, three-dimensional mesh 320, or an anisotropic region thereof (for example, anisotropic region 650), can include a lattice shear modulus measured in a forward direction (i.e., forward longitudinal direction 350) and a lattice shear modulus measured in a rearward direction (i.e., rearward longitudinal direction 350) greater than the lattice shear modulus measured in the forward direction. In some embodiments, the lattice shear modulus measured in the rearward direction can be greater than the lattice shear modulus measured in the forward direction by 10% or more. In some embodiments, the lattice shear modulus measured in the rearward direction can be greater than the lattice shear modulus measured in the forward direction by 10% to 400%, including subranges. For example, the lattice shear modulus measured in the rearward direction can be greater than the lattice shear modulus measured in the forward direction by 10% to 400%, 50% to 400%, 100% to 400%, or 200% to 400%, or within a range having any two of these values as endpoints.

In some embodiments, three-dimensional mesh 320, or an anisotropic region thereof, can have a ratio of the lattice shear modulus measured in the rearward direction to the lattice shear modulus in the forward direction that is more than 1.1. For example, in some embodiments, three-dimensional mesh 320, or an anisotropic region thereof, can have a ratio of the lattice shear modulus measured in the rearward direction to the lattice shear modulus in the forward direction ranging from 1.1 to 4, 1.1 to 3, or 1.1 to 2.

A three-dimensional mesh, or an anisotropic region thereof, with a lattice shear modulus measured in the rearward direction that is greater than the lattice shear modulus measured in the forward direction by 10% or more can be predisposed to sufficiently deform forwards (i.e., in forward longitudinal direction 350) when a sole including the three-dimensional mesh contacts the ground. Similarly, a three-dimensional mesh, or anisotropic region thereof, having a ratio of the lattice shear modulus measured in the rearward direction to the lattice shear modulus in the forward direction that is more than 1.1 can be predisposed to sufficiently deform forwards (i.e., in forward longitudinal direction 350) when a sole including the three-dimensional mesh contacts the ground.

In some embodiments, a three-dimensional mesh, or an anisotropic region thereof, can have a third lattice shear modulus measured in a transverse direction orthogonal to the forward direction (i.e., lateral or medial transverse direction 352) that is greater than the lattice shear modulus measured in the forward direction and less than the lattice shear modulus measured in the rearward direction. In other words, in such embodiments, the lattice shear modulus measured in the forward direction can be less than the lattice shear modulus measured in the transverse direction and the lattice shear modulus measured in the rearward direction can be greater than the lattice shear modulus measured in the transverse direction. In some embodiments, the value of the transverse lattice shear modulus can be between the value of the forward lattice shear modulus and the value of the rearward lattice shear modulus, and closer to the value of the stiffer rearward lattice shear modulus. This relationship between the values can help provide stability for a three-dimensional mesh, or an anisotropic region thereof.

The graphs shown in FIGS. 10-12 illustrate how arranging soft and stiff sub-cells in lattice cells as discussed herein can create anisotropic lattice shear moduli that predispose a three-dimension mesh to deform forward. The graph 1000 of FIG. 10 shows the lattice shear moduli modeling results for the lattice structure 700 shown in FIG. 7A. FIG. 7A shows a first side view (S1) and a second side view (S2) of lattice structure 700. The graph 1100 of FIG. 11 shows the lattice shear moduli modeling results for the lattice structure 720 shown in FIG. 7B. FIG. 7B shows a first side view (S1) and a second side view (S2) of lattice structure 720. The graph 1200 of FIG. 12 shows the lattice shear moduli modeling results for the lattice structure 740 shown in FIG. 7C. FIG. 7C shows a first side view (S1) and a second side view (S2) of lattice structure 740. The mechanical characteristics of the struts, the loading characteristics, and the contact mechanics for each model used to generate the results shown in FIGS. 10-12 were the same.

Lattice structure 700 is composed of soft sub-cells from isotropic lattice structure 800 shown in FIG. 8A and stiff sub-cells from isotropic lattice structure 900 shown in FIG. 9A. The soft sub-cells and the stiff sub-cells for lattice structure 700 are arranged in lattice cells as shown in FIGS. 5A and 5B. Lattice structure 720 is composed of soft sub-cells from isotropic lattice structure 820 shown in FIG. 8B and stiff sub-cells from isotropic lattice structure 920 shown in FIG. 9B. The soft sub-cells and the stiff sub-cells for lattice structure 720 are arranged in lattice cells as shown in FIGS. 5A and 5B. Lattice structure 740 is composed of soft sub-cells from isotropic lattice structure 840 shown in FIG. 8C and stiff sub-cells from isotropic lattice structure 940 shown in FIG. 9C. The soft sub-cells and the stiff sub-cells for lattice structure 740 are arranged in lattice cells as shown in FIGS. 5A and 5B.

The lattice shear moduli for each of lattice structures 700, 720, and 740 are summarized below in Table 1. In graphs 1000-1200, curve "1" is the force-displacement curve (stress-stain curve) of the lattice structure when loaded in the forward longitudinal direction, curve "2" is the force-displacement curve of the lattice structure when loaded in the rearward longitudinal direction, and curve "3" is the force-displacement curve of the lattice structure when loaded in the transverse direction. In Table 1, "delta shear modulus" is the percent difference between the forward shear modulus and the rearward shear modulus, and "shear modulus ratio" is equal to the rearward shear modulus divided by the forward shear modulus. The lattice shear moduli are reported in Netwons per millimeter (N/mm).

TABLE 1

| Lattice | forward shear modulus (N/mm) | rearward shear modulus (N/m) | transverse modulus (N/mm) | Delta shear modulus (%) | Shear modulus ratio |
|---|---|---|---|---|---|
| 700 | 33.75 | 43.75 | 40 | 30 | 1.30 |
| 720 | 40 | 95 | 65 | 138 | 2.38 |
| 740 | 36.25 | 38 | 38 | 5 | 1.05 |

Lattice structure 700 has a delta shear modulus value of 30%, meaning that the lattice shear modulus measured in the rearward direction is greater than the lattice shear modulus measured in the forward direction by 30%. The ratio of the lattice shear modulus measured in the rearward direction to the lattice shear modulus in the forward direction for lattice structure 700 is 1.3. Like lattice structure 700, lattice structure 720 has a delta shear modulus value of greater than 10%. Lattice structure 720 has a delta shear modulus value of 138%, meaning that the lattice shear modulus measured in the rearward direction is greater than the lattice shear modulus measured in the forward direction by 138%. The ratio of the lattice shear modulus measured in the rearward direction to the lattice shear modulus in the forward direction for lattice structure 720 is 2.38. Three-dimensional meshes composed of unit cells 322 arranged in the anisotropic lattice structures 700 and 720 should be capable of sufficiently deforming forward under a vertical load and converting vertical loading energy into forward displacement to help propel a wearer's foot forward when a sole including the three-dimensional mesh contacts the ground.

In contrast to lattice structures 700 and 720, lattice structure 740 has a relatively small delta shear modulus. Lattice structure 740 has a delta shear modulus value of 5%, meaning that the lattice shear modulus measured in the rearward direction is greater than the lattice shear modulus measured in the forward direction by 5%. The ratio of the lattice shear modulus measured in the rearward direction to the lattice shear modulus in the forward direction for lattice structure 740 is 1.05. Three-dimensional meshes composed of unit cells 322 arranged in the anisotropic lattice structure 740 may not be capable of converting enough vertical loading energy into forward displacement to meaningfully help propel a wearer's foot forward when a sole including the three-dimensional mesh contacts the ground.

The results summarized in Table 1 show that certain combinations of soft and stiff sub-cells can provide desired forward motion characteristics for a sole. However, not all combinations of soft and stiff sub-cell will necessarily provide desired characteristics.

In some embodiments, a three-dimensional mesh, or a mechanically anisotropic region thereof, can have a lattice compressive modulus of 10 N/mm or more. In some embodiments, a three-dimensional mesh, or a mechanically anisotropic region thereof, can have a lattice compressive modulus ranging from 10 N/mm to 25 N/mm. A lattice compressive modulus of 10 N/mm or more can provide a desired amount of cushioning for a wearer's foot when the three-dimensional mesh is incorporated into a sole for an article of footwear.

In some embodiments, a three-dimensional mesh, or a mechanically anisotropic region thereof, can have a lattice displacement in the forward direction of 3.5 mm or more. In some embodiments, a three-dimensional mesh, or a mechanically anisotropic region thereof, can have a lattice displacement in the forward direction of 3.5 mm to 10 mm. A lattice displacement in the forward direction of 3.5 mm or more can provide a suitable amount of forward displacement to meaningfully help propel a wearer's foot forward when a sole including the three-dimensional mesh contacts the ground.

Graph 1300 in FIG. 13 is a plot of the lattice compressive modulus ("Comp. Stiffness") versus the lattice displacement in the forward direction for various lattice structures according to some embodiments. In graph 1300, lattice structure 700 is labeled as "Multi 13", lattice structure 720 is labeled as "Multi 21" and lattice structure 740 is labeled as "Multi 7."

A three-dimensional mesh 320 as described herein can be made using a three-dimensional (3-D) printing process. In such embodiments, 3-D printing three-dimensional mesh 320 for a sole includes printing a plurality of interconnected unit cells 322, with each interconnected unit cell 322 including a plurality of struts 330 defining a three-dimensional shape and a plurality of nodes 340 at which one or more struts 330 are connected. In some embodiments, the 3-D printing process can include printing a set of interconnected unit cells 322 that define one or more mechanically anisotropic regions for the three-dimensional mesh 320. The mechanically anisotropic region(s) for the three-dimensional mesh 320 can include unit cells 322 and anisotropic lattice shear moduli as discussed herein.

In some embodiments, the arrangement of soft sub-cells and stiff sub-cells as described herein can be leveraged to create a three-dimensional mesh 320 with a perimeter structure having a unique pattern. In some embodiments, a three-dimensional mesh 320 can have a perimeter sidewall defining a perimeter structure defined by soft sub-cells and stiff sub-cells arranged as described herein. The perimeter sidewall of a three-dimensional mesh 320 is defined by the forefoot end, heel end, medial side, and lateral side of the three-dimensional mesh 320. The perimeter structure of the perimeter sidewall can be the perimeter structure in side view from medial transverse direction 352 or lateral transverse direction 352 of a three-dimensional mesh 320.

Figure 18:
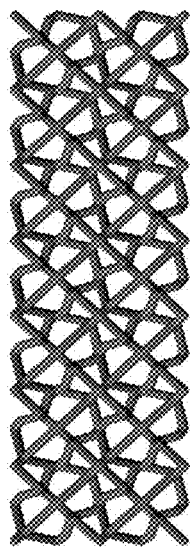
FIG. 18 is a perimeter structure according to some embodiments.
Figure 17:
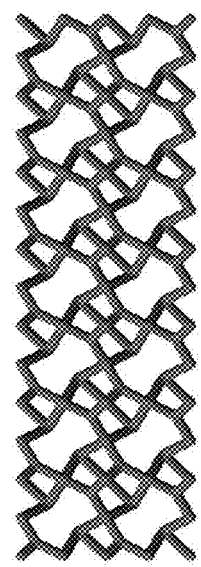
FIG. 17 is a perimeter structure according to some embodiments.
Figure 20:
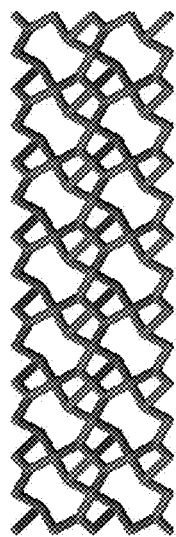
FIG. 20 is a perimeter structure according to some embodiments.
Figure 19:
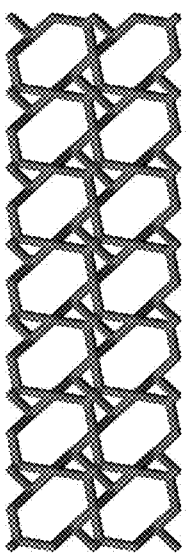
FIG. 19 is a perimeter structure according to some embodiments.
Figure 22:
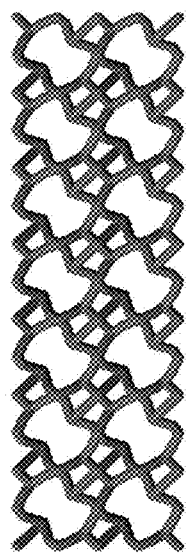
FIG. 22 is a perimeter structure according to some embodiments.
Figure 21:
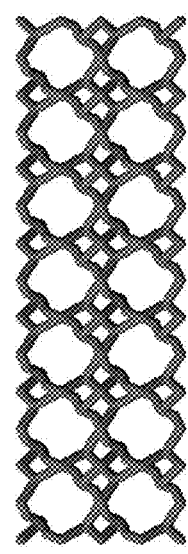
FIG. 21 is a perimeter structure according to some embodiments.
Figure 24:
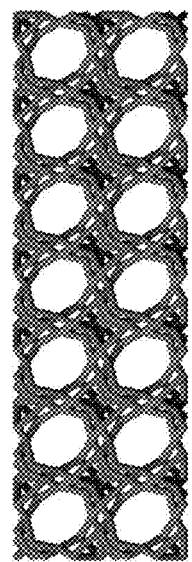
FIG. 24 is a perimeter structure according to some embodiments.
Figure 23:
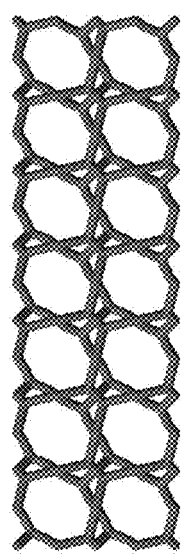
FIG. 23 is a perimeter structure according to some embodiments.
Figure 26:
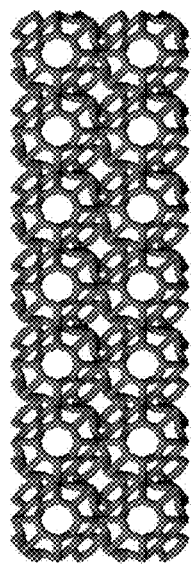
FIG. 26 is a perimeter structure according to some embodiments.
Figure 25:
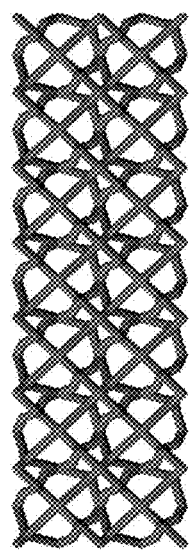
FIG. 25 is a perimeter structure according to some embodiments.

In some embodiments, a three-dimensional mesh as described herein can have a perimeter sidewall defining a perimeter structure including the structure shown in FIG. 17. In some embodiments, a three-dimensional mesh as described herein can have a perimeter sidewall defining a perimeter structure including the structure shown in FIG. 18. In some embodiments, a three-dimensional mesh as described herein can have a perimeter sidewall defining a perimeter structure including the structure shown in FIG. 19. In some embodiments, a three-dimensional mesh as described herein can have a perimeter sidewall defining a perimeter structure including the structure shown in FIG. 20. In some embodiments, a three-dimensional mesh as described herein can have a perimeter sidewall defining a perimeter structure including the structure shown in FIG. 21. In some embodiments, a three-dimensional mesh as described herein can have a perimeter sidewall defining a perimeter structure including the structure shown in FIG. 22. In some embodiments, a three-dimensional mesh as described herein can have a perimeter sidewall defining a perimeter structure including the structure shown in FIG. 23. In some embodiments, a three-dimensional mesh as described herein can have a perimeter sidewall defining a perimeter structure including the structure shown in FIG. 24. In some embodiments, a three-dimensional mesh as described herein can have a perimeter sidewall defining a perimeter structure including the structure shown in FIG. 25. In some embodiments, a three-dimensional mesh as described herein can have a perimeter sidewall defining a perimeter structure including the structure shown in FIG. 26.

In some embodiments, a three-dimensional mesh as described herein can have a perimeter sidewall defining a perimeter structure having a plurality of eight-sided regions defined by eight struts 330 and arranged in a pattern at the perimeter sidewall. The plurality of eight-sided regions defined by eight struts 330 can have substantially the same size. In some embodiments, the plurality of eight-sided regions defined by eight struts 330 can be arranged directly adjacent to each other at the perimeter sidewall. Directly adjacent eight-sided regions share one or more struts defining their eight-sided shapes. In some embodiments, the plurality of eight-sided regions defined by eight struts 330 can each have a bowtie perimeter shape.

FIGS. 6A and 6B show a midsole 600 having a perimeter sidewall 610 with a perimeter structure 660 according to some embodiments. Perimeter structure 660 includes a plurality of eight-sided regions 662 arranged directly adjacent to each other and having substantially the same size. Directly adjacent eight-sided regions 662 share one or more border struts 666. The plurality of eight-sided regions 662 can be defined by eight border struts 666 connected at eight nodes 340. As shown in FIGS. 6A and 6B, these eight-sided regions 662 can have a bowtie perimeter shape (see dotted lines in FIG. 6B).

In some embodiments, the plurality of eight-sided regions 662 can include a first eight-sided region 664 having four openings 665 defined by four interior struts 667 connected at an interior node 668 and a second eight-sided region 670 having a single opening 672 defined by eight border struts 666. In some embodiments, the plurality of eight-sided regions 662 can include a plurality of first eight-sided regions 664 having four openings 665 defined by four interior struts 667 connected at an interior node 668 and a plurality of second eight-sided regions 670 having a single opening 672 defined by eight border struts 666. An interior node 668 is a node located within an eight-sided region 662. Similarly, an interior strut 667 is a strut that extends into an eight-sided region 662. Border struts 666 for an eight-sided region 662 define the perimeter shape of the region 662.

In some embodiments, the plurality of first eight-sided regions 662 can be arranged in a first row 680 extending in longitudinal direction 350 between forefoot end 602 of midsole 600 and heel end 604 of midsole 600. In some embodiments, the plurality of second eight-sided regions 670 can be arranged in a second row 690 extending in longitudinal direction 350 between forefoot end 602 of midsole 600 and heel end 604 of midsole 600. In some embodiments, first row 680 can be located above second row 690 in vertical direction 354. In some embodiments, first row 680 can be located below second row 690 in vertical direction 354. In some embodiments, as shown in FIGS. 6A and 6B, perimeter structure 660 can include the structure shown in FIG. 17.

In some embodiments, all or a portion of a three-dimensional mesh as described herein can be coated with a color coating. In some embodiments, the color coating can be an internal color coating configured to accentuate all or a portion of a perimeter structure of a three-dimensional mesh. In some embodiments, the color coating can be coated directly on surfaces of struts and nodes for unit cells defining a three-dimensional mesh. In some embodiments, the color coating can be a powder coating. In some embodiments, color coating can be a paint coating.

Figure 15:
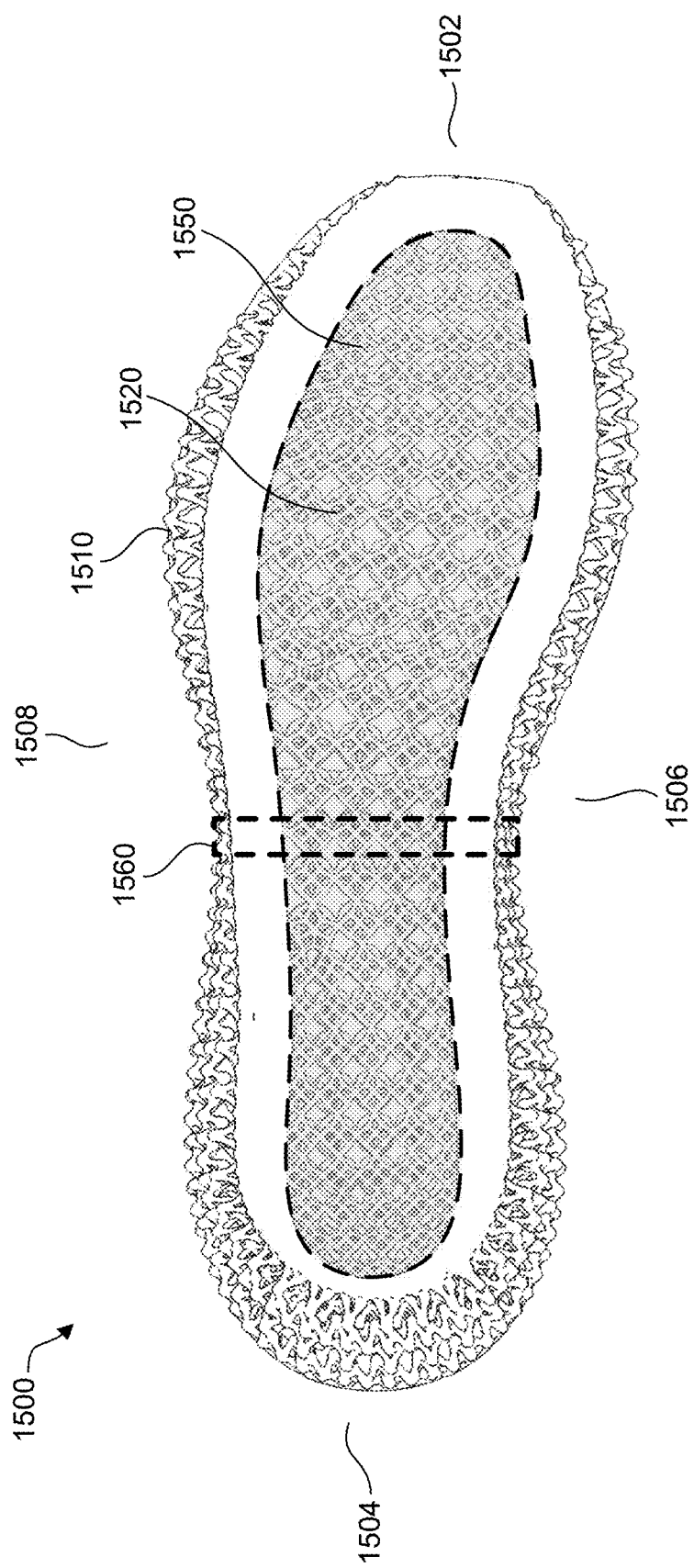
FIG. 15 is a coated midsole according to some embodiments.
Figure 16:
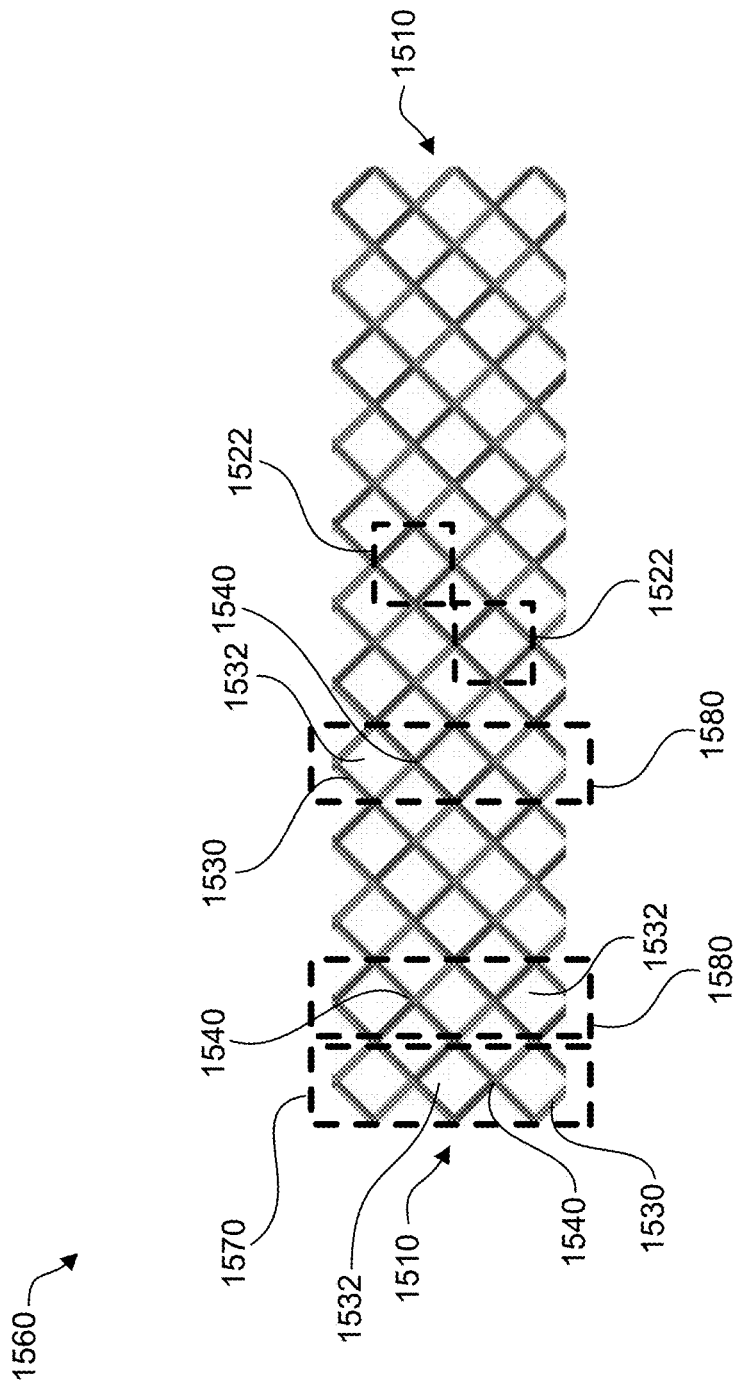
FIG. 16 shows a transverse stack of unit cells according to some embodiments.

FIGS. 15 and 16 show a color-coated midsole 1500 according to some embodiments. Midsole 1500 includes a three-dimensional mesh 1520 having a forefoot end 1502, a heel end 1504, a medial side 1506, and a lateral side 1508. Three-dimensional mesh 1520 includes a plurality of interconnected unit cells 1522 with a plurality of struts 1530 connected at nodes 1540 defining a three-dimensional shape of the unit cells 1522. A plurality of interconnected unit cells 1522 define at least a portion of a perimeter sidewall 1510 of three-dimensional mesh 1520. In some embodiments, unit cells 1522 defining a perimeter of forefoot end 1502, heel end 1504, medial side 1506, and lateral side 1508 define a perimeter sidewall 1510 of three-dimensional mesh 1520.

Three-dimensional mesh 1520 includes a color coating 1550 coated on a portion of three-dimensional mesh 1520. Color coating 1550 is not coated on at least a portion of perimeter sidewall 1510 of three-dimensional mesh 1520. In some embodiments, color coating 1550 is not coated on any portion of perimeter sidewall 1510 of three-dimensional mesh 1520. By not coating color coating 1550 on at least a portion of perimeter sidewall 1510, the perimeter structure of perimeter sidewall 1510 can be accentuated by the color contrast between the perimeter sidewall 1510 and interior portions of three-dimensional mesh 1520 coated with color coating 1550. In some embodiments, the perimeter structure of perimeter sidewall 1510 can include one or more of the structures shown in FIGS. 17-26.

In some embodiments, one or more perimeter columns of unit cells 1522 defining perimeter sidewall 1510 of three-dimensional mesh 1520 may not be coated with color coating 1550 to accentuate the perimeter structure of perimeter sidewall 1510. FIG. 16 is a schematic of a transverse stack 1560 of the unit cells 1522. Transverse stack 1560 can extend from medial side 1506 to lateral side 1508 of three-dimensional mesh 1520. The transverse stack 1560 includes an exterior column 1570 of unit cells 1522 defining at least a portion of perimeter sidewall 1510 of three-dimensional mesh 1520 and one or more interior columns 1580 of unit cells 1522 disposed interior of exterior column 1570. In some embodiments, color coating 1550 can be coated on at least a portion of one or more interior columns 1580 of unit cells 1522 and is not coated on the exterior column 1570 of unit cells 1522.

In some embodiments, the plurality of interconnected unit cells 1522 defining three-dimensional mesh 1520 can have a first color and the color coating 1550 has a second color different from the first color. The colors of color coating 1550 and three-dimensional mesh 1520 can be characterized by a three-coordinate color space, for example the CIELab space. In this system, each color is characterized by the lightness value (L*), a chroma value (a*), and a hue value (b*). Through use of a spectrophotometer, these three values can be measured and differences in color can be characterized. CIELab colors can be measured using ISO/CIE 11664-4:2019 ("Colorimetry—Part 4: CIE 1976 L*a*b Colour Space"). A first color described as being different from a second color has one or more of a lightness value, a chroma value, or a hue value that is at least 10% higher or at least 10% lower than the lightness value, chroma value, and hue value the second color. In some embodiments, the first color can have a lightness value of at least 10% higher or at least 10% lower than the lightness value of the second color. In some embodiments, the first color can have a chroma value of at least 10% higher or at least 10% lower than the chroma value of the second color. In some embodiments, the first color can have a hue value of at least about 10% higher or at least about 10% lower than the hue value of the second color.

In some embodiments, the first color can be selected from the group of: red, crimson, maroon, magenta, pink, orange, yellow, gold, chartreuse, green, blue, navy, aqua, teal, cerulean, indigo, violet, purple, brown, black, grey, white, beige, silver, or taupe. In some embodiments, the second color can be selected from the group of: red, crimson, maroon, magenta, pink, orange, yellow, gold, chartreuse, green, blue, navy, aqua, teal, cerulean, indigo, violet, purple, brown, black, grey, white, beige, silver, or taupe.

In some embodiments, color coating 1550 does not fill spaces 1532 between a plurality of struts 1530 defining unit cells 1522 of three-dimensional mesh 1520. In some embodiments, color coating 1550 does not extend between individual struts 1530 not connected to each other at a node 1540. In such embodiments, color coating 1550 can provide desired aesthetic benefits without masking the three-dimensional shape of unit cells 1522 defining three-dimensional mesh 1520.

Where a range of numerical values comprising upper and lower values is recited herein, unless otherwise stated in specific circumstances, the range is intended to include the endpoints thereof, and all integers and fractions within the range. It is not intended that the disclosure or claims be limited to the specific values recited when defining a range. Further, when an amount, concentration, or other value or parameter is given as a range, one or more ranges, or as list of upper values and lower values, this is to be understood as specifically disclosing all ranges formed from any pair of any upper range limit or value and any lower range limit or value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" refers to a value that is within ±10% of the value stated. For example, about 10% can include any percentage between 9% and 11%.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A sole for an article of footwear, the sole comprising:
a three-dimensional mesh comprising:
a plurality of interconnected anisotropic unit cells, each interconnected anisotropic unit cell comprising: a plurality of struts, a plurality of nodes at which one or more struts are connected, and a plurality of sub-cells each composed of two or more of the plurality of the struts and one or more of the nodes of the unit cell,
wherein the plurality of sub-cells of each unit cell comprise a soft sub-cell and a stiff sub-cell, and
wherein the soft sub-cell comprises a first isotropic lattice structure type comprising a first arrangement of struts, and wherein the stiff sub-cell comprises a second isotropic lattice structure type different from the first isotropic lattice structure type and comprising a second arrangement of struts different from the first arrangement of struts.

2. The sole of claim 1, wherein each unit cell comprises a plurality of the soft sub-cells and a plurality of the stiff sub-cells.

3. The sole of claim 1, wherein each unit cell comprises:
a plurality of the soft sub-cells and a plurality of the stiff sub-cells,
an upper-forward quadrant comprising at least one of the plurality of soft sub-cells,
an upper-rearward quadrant comprising at least one of the plurality of stiff sub-cells,
a lower-forward quadrant comprising at least one of the plurality of stiff sub-cells, and
a lower-rearward quadrant comprising at least one of the plurality of soft sub-cells.

4. The sole of claim 3, wherein:
the upper-forward quadrant comprises two of the soft sub-cells,
the upper-rearward quadrant comprises two of the stiff sub-cells,
the lower-forward quadrant comprises two of the stiff sub-cells, and
the lower-rearward quadrant comprises two of the soft sub-cells.

5. The sole of claim 1, wherein each unit cell comprises eight sub-cells.

6. The sole of claim 5, wherein the eight sub-cells comprise four of the soft sub-cells and four of the stiff sub-cells.

7. The sole of claim 5, wherein the eight sub-cells comprise a plurality of the soft sub-cells and a plurality of the stiff sub-cells.

8. The sole of claim 7, wherein the eight sub-cells comprise:
an upper-forward-medial soft sub-cell,
an upper-forward-lateral soft sub-cell,
an upper-rearward-medial stiff sub-cell,
an upper-rearward-lateral stiff sub-cell,
a lower-forward-medial stiff sub-cell,
a lower-forward-lateral stiff sub-cell,
a lower-rearward-medial soft sub-cell, and
a lower-rearward-lateral soft-sub cell.

9. The sole of claim 1, wherein the first isotropic lattice structure type comprises a first modeled compressive modulus and the second isotropic lattice structure type comprises a second modeled compressive modulus 15% or more greater than the first modeled compressive modulus.

10. The sole of claim 1, wherein the first isotropic lattice structure type comprises a first modeled shear modulus and the second isotropic lattice structure type comprises a second modeled shear modulus 15% or more greater than the first modeled shear modulus.

11. The sole of claim 1, wherein the three-dimensional mesh comprises:
a lattice shear modulus measured in a forward direction, and
a lattice shear modulus measured in a rearward direction greater than the lattice shear modulus measured in the forward direction.

12. The sole of claim 11, wherein the lattice shear modulus measured in a rearward direction is greater than the lattice shear modulus measured in the forward direction by 10% or more.

13. A sole for an article of footwear, the sole comprising:
a three-dimensional mesh comprising:
a plurality of interconnected anisotropic unit cells, each interconnected anisotropic unit cell comprising a plurality of struts, a plurality of nodes at which one or more struts are connected, and a plurality of sub-cells composed of two or more of the plurality of struts and one or more of the nodes of the unit cell; and
a mechanically anisotropic region comprising the plurality of interconnected anisotropic unit cells, wherein the anisotropic unit cells comprise anisotropic lattice shear moduli comprising: a first lattice shear modulus measured in a forward direction, and a second lattice shear modulus measured in a rearward direction opposite the forward direction and greater than the first lattice shear modulus,
wherein the plurality of sub-cells of each anisotropic unit cell comprise a plurality of soft sub-cells and a plurality of stiff sub-cells,
wherein the plurality of soft sub-cells comprise a first isotropic lattice structure type and wherein the plurality of stiff sub-cells comprise a second isotropic lattice structure type different from the first isotropic lattice structure type, and
wherein an arrangement of the plurality of stiff sub-cells and the plurality of soft sub-cells within each unit cell creates the anisotropic lattice shear moduli.

14. The sole of claim 13, wherein the second lattice shear modulus is greater than the first lattice shear modulus by 10% or more.

15. The sole of claim 13, wherein:
wherein the anisotropic unit cells further comprise a third lattice shear modulus measured in a transverse direction orthogonal to the forward direction,
the first lattice shear modulus is less than the third lattice shear modulus, and
the second lattice shear modulus is greater than the third lattice shear modulus.

16. The sole of claim 13, wherein the mechanically anisotropic region comprises a lattice compressive modulus ranging from 10 N/mm to 25 N/mm.

17. The sole of claim 13, wherein the mechanically anisotropic region comprises a lattice displacement in the forward direction ranging from 3.5 mm to 10 mm.

18. The sole of claim 13, wherein the mechanically anisotropic region is predisposed to deform forward under a vertical load.

19. A sole for an article of footwear, the sole comprising:
   a three-dimensional mesh comprising:
      a plurality of interconnected unit cells, each interconnected unit cell comprising: a plurality of struts, a plurality of nodes at which one or more struts are connected, and a plurality of sub-cells each composed of two or more of the plurality of the struts and one or more of the nodes of the unit cell,
      wherein the plurality of sub-cells of each unit cell comprise a soft sub-cell and a stiff sub-cell, and
      wherein the soft sub-cell comprises a first isotropic lattice structure type and wherein the stiff sub-cell comprises a second isotropic lattice structure type different from the first isotropic lattice structure type, and
      wherein each unit cell comprises:
         a plurality of the soft sub-cells and a plurality of the stiff sub-cells,
         an upper-forward quadrant comprising at least one of the plurality of soft sub-cells,
         an upper-rearward quadrant comprising at least one of the plurality of stiff sub-cells,
         a lower-forward quadrant comprising at least one of the plurality of stiff sub-cells, and
         a lower-rearward quadrant comprising at least one of the plurality of soft sub-cells.

* * * * *